United States Patent
Abotabl et al.

(10) Patent No.: US 12,238,030 B2
(45) Date of Patent: Feb. 25, 2025

(54) DMRS ALLOCATION IN SUB-BAND FULL DUPLEX

(71) Applicant: QUALCOMM Incorporated, San Diego, CA (US)

(72) Inventors: Ahmed Attia Abotabl, Carlsbad, CA (US); Muhammad Sayed Khairy Abdelghaffar, San Jose, CA (US); Alexandros Manolakos, San Diego, CA (US); Krishna Kiran Mukkavilli, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 17/756,764

(22) PCT Filed: Dec. 16, 2020

(86) PCT No.: PCT/US2020/065402
§ 371 (c)(1),
(2) Date: Jun. 1, 2022

(87) PCT Pub. No.: WO2021/133616
PCT Pub. Date: Jul. 1, 2021

(65) Prior Publication Data
US 2023/0024369 A1    Jan. 26, 2023

(30) Foreign Application Priority Data

Dec. 27, 2019  (GR) .............................. 20190100590

(51) Int. Cl.
*H04L 5/00*  (2006.01)
*H04L 5/14*  (2006.01)

(52) U.S. Cl.
CPC .............. *H04L 5/0051* (2013.01); *H04L 5/14* (2013.01)

(58) Field of Classification Search
CPC ................................ H04L 5/0051; H04L 5/14
See application file for complete search history.

(56) References Cited

U.S. PATENT DOCUMENTS 10,368,346 B2    7/2019  Luo et al.
2018/0083824 A1  3/2018  Yang et al.
(Continued)

FOREIGN PATENT DOCUMENTS

CN    106937388 A    7/2017
EP    3541033 A1     9/2019
(Continued)

OTHER PUBLICATIONS

Huawei, et al., "UL DMRS Design for Data Transmission", 3GPP Draft, R1-1706935, 3GPP TSG RAN WG1 Meeting #89, vol. RAN WG1, No. Hangzhou, China, May 8, 2017 (May 8, 2017), XP051263397, pp. 1-4, Retrieved from the Internet: URL:http://www.3gpp.org/ftp/tsg_ran/WG1_RL1/TSGR1_89/Docs/, the whole document.

(Continued)

*Primary Examiner* — Derrick V Rose
(74) *Attorney, Agent, or Firm* — Paul M. McAdams; Shumaker & Sieffert, PA

(57) ABSTRACT

This disclosure provides systems, devices, apparatus and methods, including computer programs encoded on storage media, for DMRS allocation in sub-band FD. For transmission of UL data in a set of symbols having UL DMRS in at least one symbol, a UE may determine which symbol(s) in a subframe will receive DL DMRS so that the UE may align the transmission of the UL DMRS with a reception of the DL DMRS. For transmission of DL data in a set of symbols (Continued)

having a DL DMRS, a BS may determine for a first subset of symbols that a PUSCH will be received from the UE or determine for a second subset of symbols that a PUSCH will not be received from the UE. The BS insert a DL RS within the first subset of symbols or the second subset of symbols based on the determination regarding the PUSCH.

22 Claims, 16 Drawing Sheets

(56) References Cited

U.S. PATENT DOCUMENTS

| | | | | |
|---|---|---|---|---|
| 2018/0324688 | A1* | 11/2018 | Li | H04W 72/12 |
| 2019/0190636 | A1* | 6/2019 | Kim | H04W 72/23 |
| 2020/0044796 | A1* | 2/2020 | Yang | H04W 56/00 |
| 2020/0221435 | A1* | 7/2020 | Kim | H04L 5/0048 |
| 2020/0229202 | A1* | 7/2020 | Bagheri | H04L 25/0226 |

FOREIGN PATENT DOCUMENTS

| | | | |
|---|---|---|---|
| WO | 2017075284 | A1 | 5/2017 |
| WO | 2019225970 | A1 | 11/2019 |

OTHER PUBLICATIONS

International Search Report and Written Opinion—PCT/US2020/065402—ISA/EPO—Mar. 29, 2021.
ZTE, et al., "Remaining Details on DL DMRS and UL DMRS", 3GPP TSG RAN WG1 Meeting 90bis, R1-1717433, Prague, CZ, 20171009 20171013, pp. 1-8, Oct. 3, 2017.

* cited by examiner

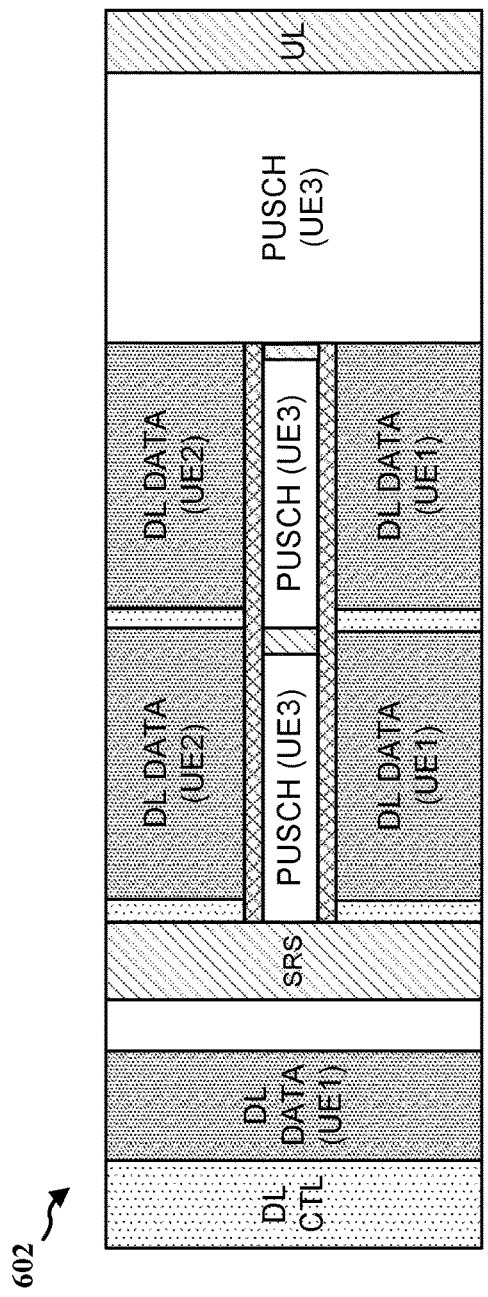
FIG. 6A
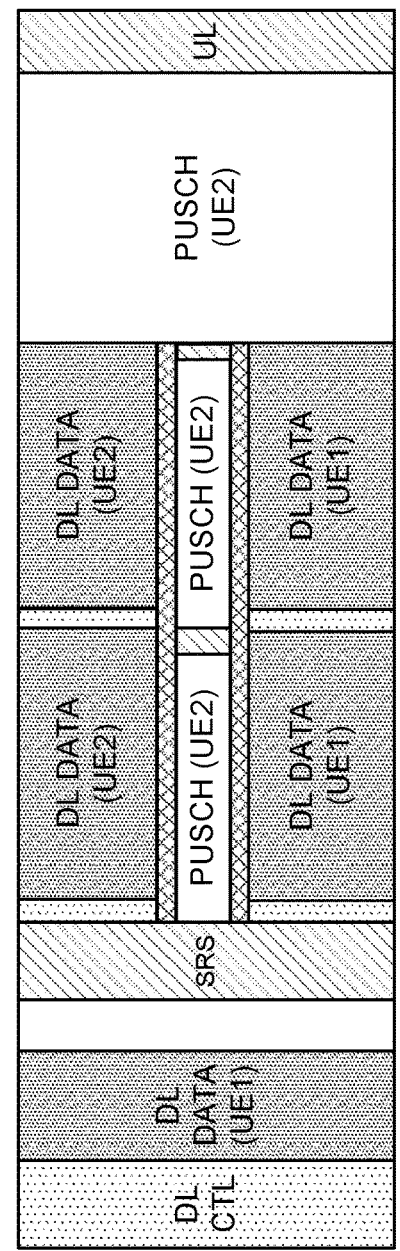
FIG. 6B
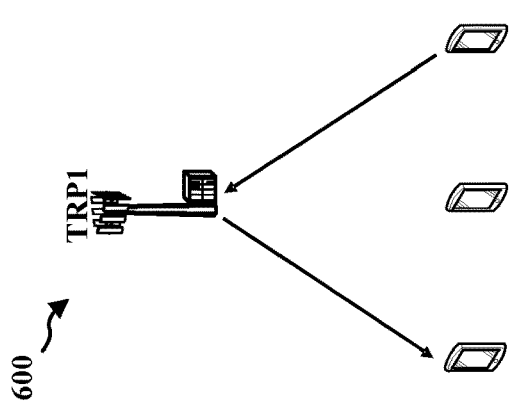
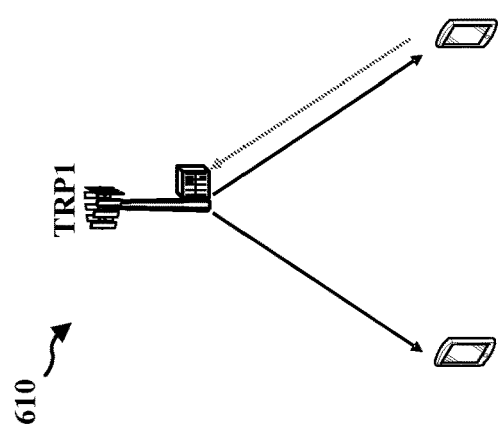

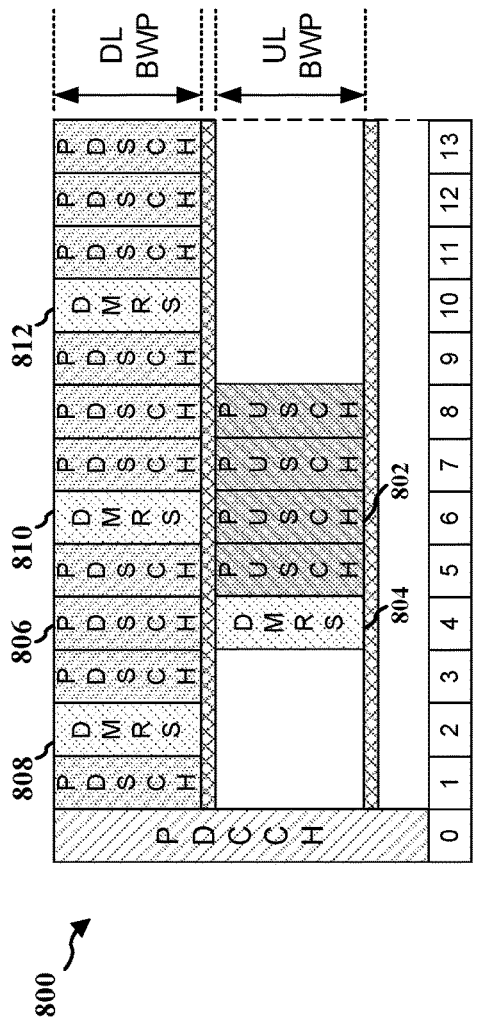
FIG. 8A
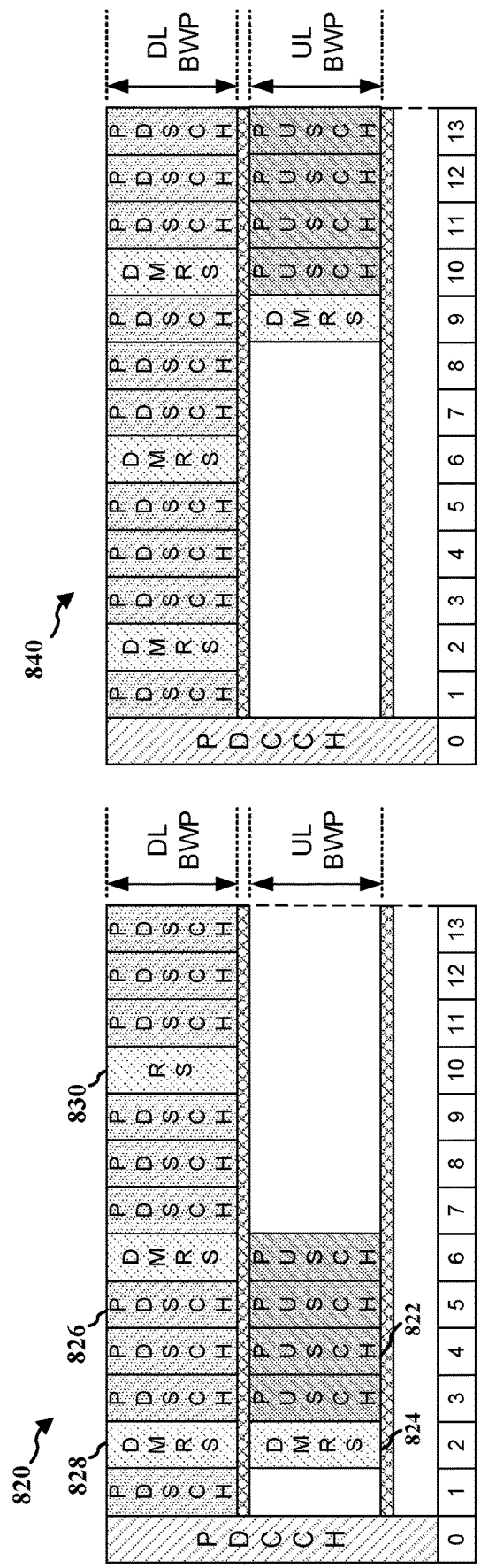
FIG. 8B
FIG. 8C

DMRS ALLOCATION IN SUB-BAND FULL DUPLEX

CROSS REFERENCE TO RELATED APPLICATION

This application is a National Phase entry of PCT Application No. PCT/US2020/065402, entitled "DMRS ALLOCATION IN SUB-BAND FULL DUPLEX" and filed on Dec. 16, 2020, which claims priority of Greek application No. 20190100590, entitled "DMRS ALLOCATION IN SUB-BAND FULL DUPLEX" and filed on Dec. 27, 2019, all of which are expressly incorporated by reference herein in their entirety.

BACKGROUND

Technical Field

The present disclosure relates generally to communication systems, and more particularly, to a demodulation reference signal (DMRS) allocation in sub-band full duplex operations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Full duplex (FD) communication is a wireless communication method that supports simultaneous transmission and reception of information over a same frequency band. In this manner, spectral efficiency can be improved over half duplex (HD) communication, which only supports transmission/reception of information in one direction at a time. Downlink (DL) data may be received by a user equipment (UE) in a physical downlink shared channel (PDSCH) in a set of symbols that includes at least one DL DMRS, and uplink (UL) data may be transmitted by the UE in a physical uplink shared channel (PUSCH) in a same or different set of symbols that includes at least one UL DMRS. When a symbol mismatch occurs between the DL DMRS and the UL transmission, the DL DMRS does not capture leakage from the UL transmission such that decoding of the PDSCH may be adversely affect.

Accordingly, described herein are systems, devices, apparatus and methods, including computer programs encoded on storage media, for DMRS allocation in sub-band FD. More specifically, when the DL DMRS does not overlap in time with (e.g., occupy a same symbol as) the UL transmission, a base station (BS) may insert a DL DMRS into a portion of the DL transmission that does overlap in time with the UL transmission to thereby capture the leakage from the UL transmission. Further, the UE may be configured to align the UL DMRS in the UL transmission with the DL DMRS in the DL transmission, as alignment of the UL DMRS with the DL DMRS may provide improved estimation of channel properties over channel estimations performed where the DL DMRS is aligned only with the PUSCH.

For transmission of the UL data in a set of symbols having UL DMRS in at least one symbol, a UE may determine which symbol(s) in a subframe will receive DL DMRS so that the UE may align the transmission of the UL DMRS with a reception of the DL DMRS. For transmission of DL data in a set of symbols having a DL DMRS, a BS may determine for a first subset of symbols that a PUSCH will be received from the UE or determine for a second subset of symbols that a PUSCH will not be received from the UE. The BS may then insert a DL reference signal (RS) within the first subset of symbols or the second subset of symbols based on the determination regarding the PUSCH.

In an aspect of the disclosure, a method, a computer-readable medium, and an apparatus are provided. The apparatus is a wireless device at a UE that includes a memory and at least one processor coupled to the memory. The at least one processor is configured to determine to transmit UL data in a set of symbols within a subframe, determine one or more symbols within the set of symbols in which DL DMRS can be received by the UE, and determine to align a transmission of UL DMRS with reception of the DL DMRS such that the UL DMRS is transmitted in at least one symbol of the one or more symbols. The UE transmits the UL data in a PUSCH in the set of symbols including the UL DMRS in the at least one symbol.

In another aspect of the disclosure, a method, a computer-readable medium, and an apparatus are provided. The apparatus is a wireless device at a BS that includes a memory and at least one processor coupled to the memory. The at least one processor is configured to determine to transmit DL data in a set of symbols within a subframe, determine at least one of a first subset of symbols within the set of symbols in which a PUSCH will be received from a UE or a second subset of symbols within the set of symbols in which a PUSCH will not be received from the UE, and determine to insert at least one DL RS within at least one of the first subset of symbols or the second subset of symbols. The BS transmits the DL data in a PDSCH in the set of symbols including the at least one DL RS in the at least one of the first subset of symbols or the second subset of symbols.

In a further aspect of the disclosure, a method, a computer-readable medium, and an apparatus are provided. The apparatus is a wireless device at a UE that includes a memory and at least one processor coupled to the memory. The at least one processor is configured to receive a first subset of a PDSCH in a first set of symbols of a subframe. The first subset of the PDSCH includes a first subset of DL DMRS and the first set of symbols are non-overlapping in time with an UL transmission from the UE. The at least one processor is further configured to concurrently transmit a PUSCH to a BS in a second set of symbols of the subframe and receive a second subset of a PDSCH in the second set of symbols of the subframe. The PUSCH from the UE in the second set of symbols includes UL DMRS, where the second set of symbols are overlapping in time with the DL reception. The second subset of the PDSCH includes a second subset of DL DMS.

In yet another aspect of the disclosure, a method, a computer-readable medium, and an apparatus are provided. The apparatus is a wireless device at a BS that includes a memory and at least one processor coupled to the memory. The at least one processor is configured to transmit a first subset of a PDSCH to a UE in a first set of symbols of a subframe. The first subset of the PDSCH includes a first subset of DL DMRS and the first set of symbols are non-overlapping in time with an UL transmission from the UE. The at least one processor is further configured to concurrently transmit a second subset of a PDSCH to the UE in a second set of symbols of the subframe and receive a PUSCH from the UE in the second set of symbols. The second subset of the PDSCH includes a second subset of DL DMRS, where the second set of symbols are overlapping in time with the UL transmission from the UE. The PUSCH from the UE in the second set of symbols includes UL DMRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A and 6B illustrates frequency division duplex (FDD) BSs in communication with HD UEs and FD UEs, respectively, as well as exemplary resource arrangements that may correspond thereto.

FIGS. 8A, 8B, and 8C illustrate DMRS arrangements with respect to PDSCH and PUSCH allocations.

DETAILED DESCRIPTION

Figure 1:
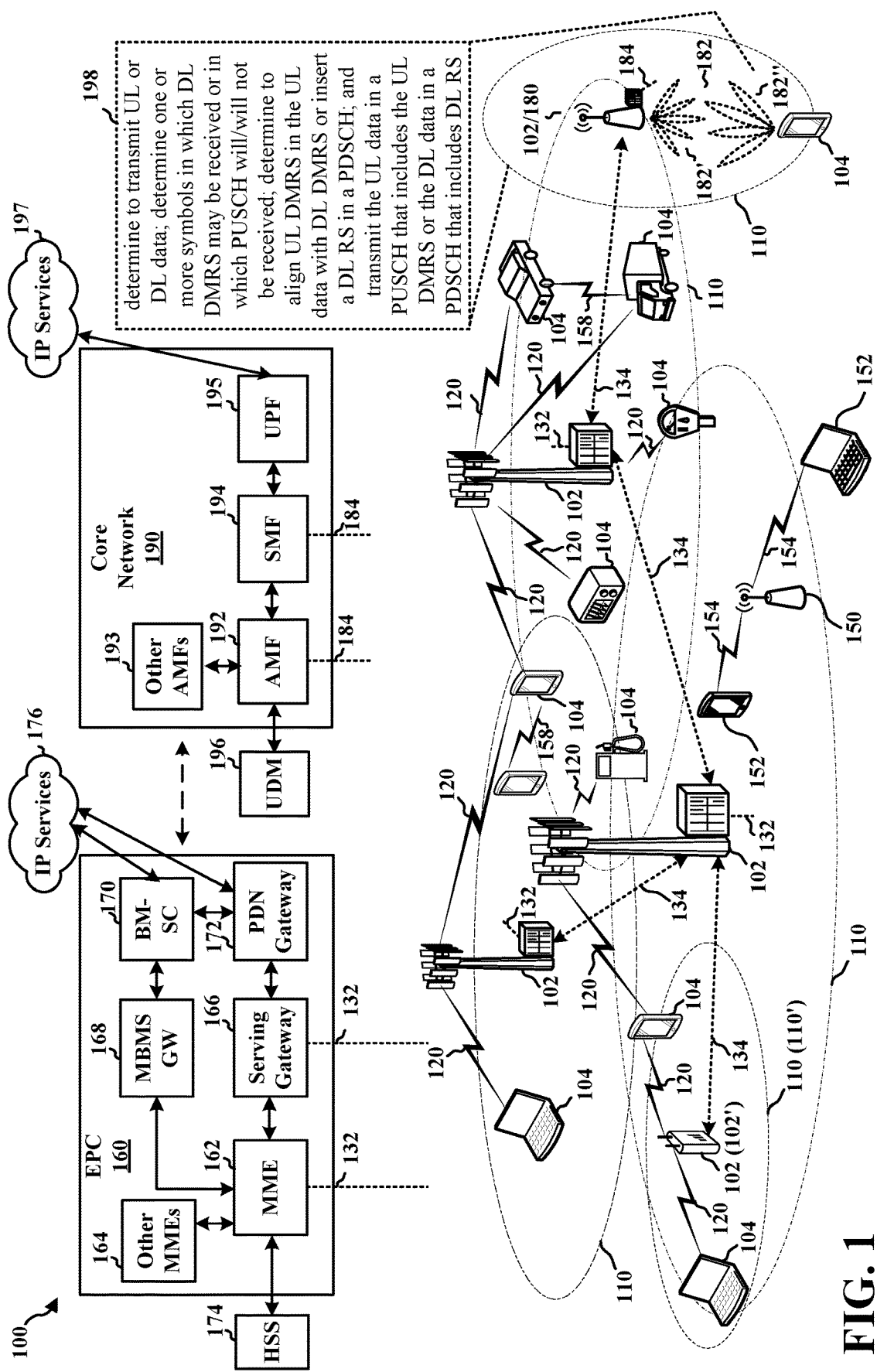
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or DL (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine to transmit UL data; determine one or more symbols in which DL DMRS may be received; determine to align UL DMRS in the UL data with DL DMRS; and transmit the UL data in a PUSCH that includes the UL DMRS (198). In other aspects, the BS 180 may be configured to determine to transmit DL data; determine one or more symbols in which PUSCH will/will not be received; determine to insert a DL RS in a PDSCH; and transmit the DL data in a PDSCH that includes DL RS (198). Although the following description may be focused on 5G NR, the concepts described herein may be applicable to other similar areas, such as LTE, LTE-A, CDMA, GSM, and other wireless technologies.

Figure 2:
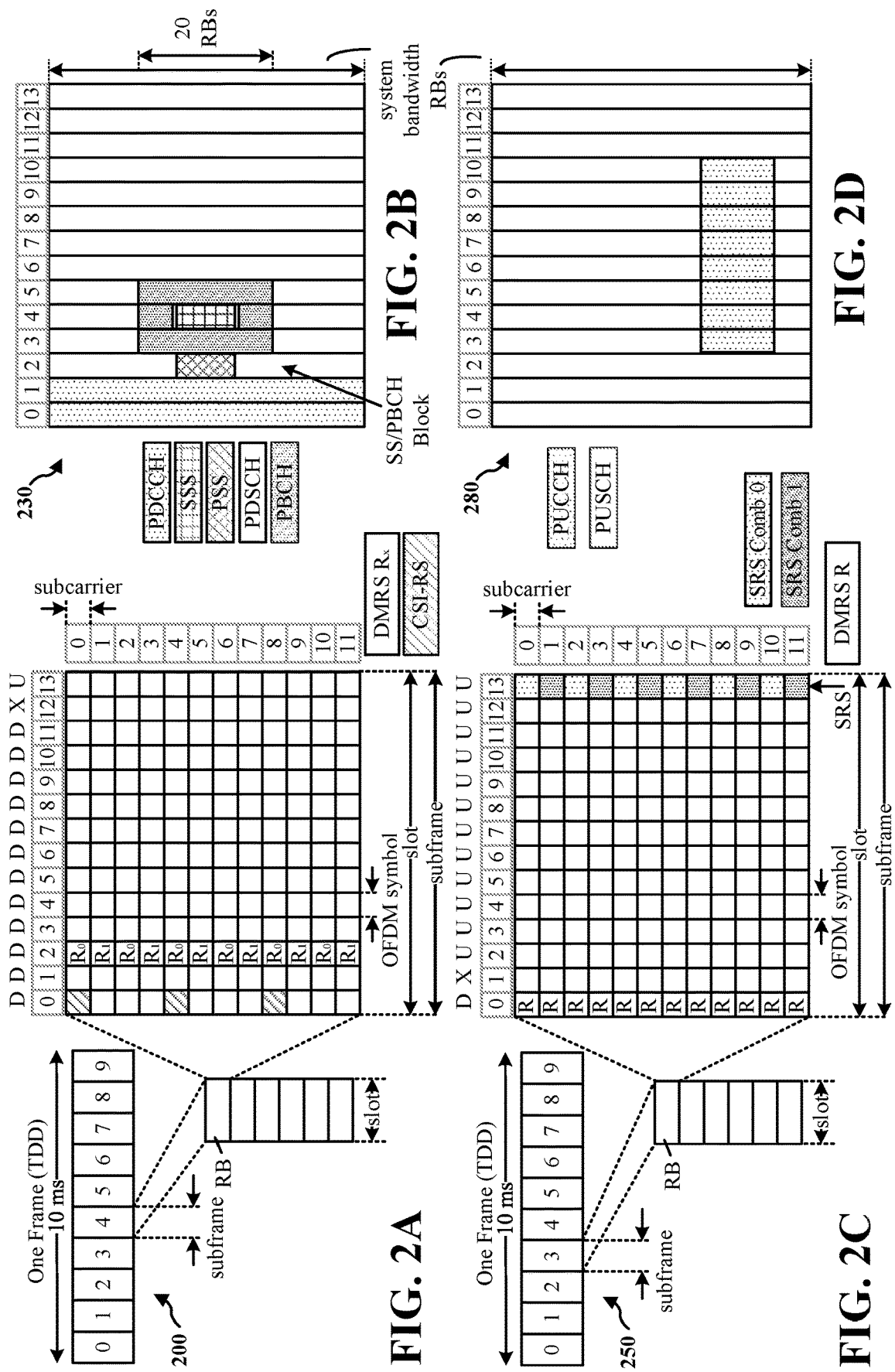
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
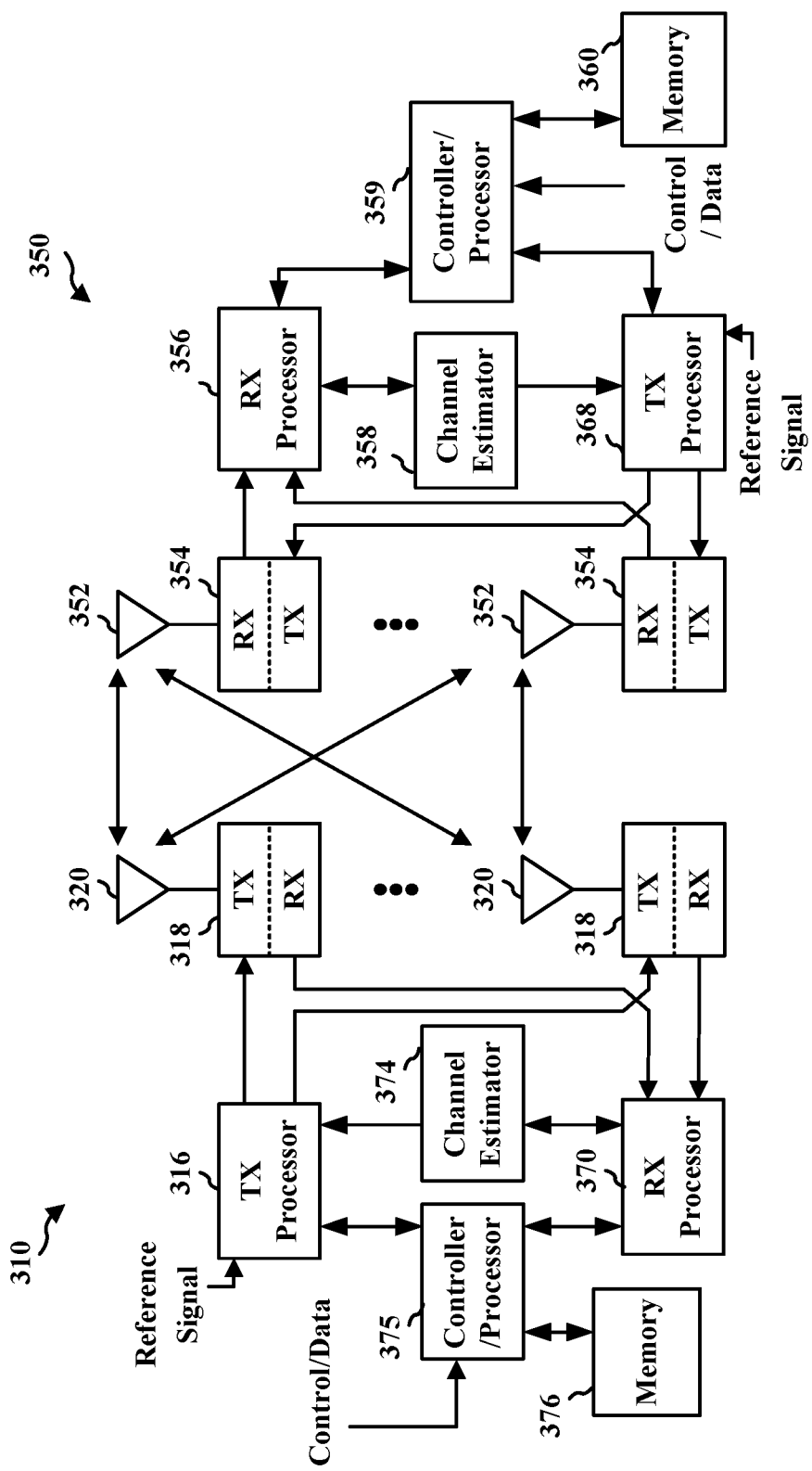
FIG. 3 is a diagram illustrating an example of a BS and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4A:
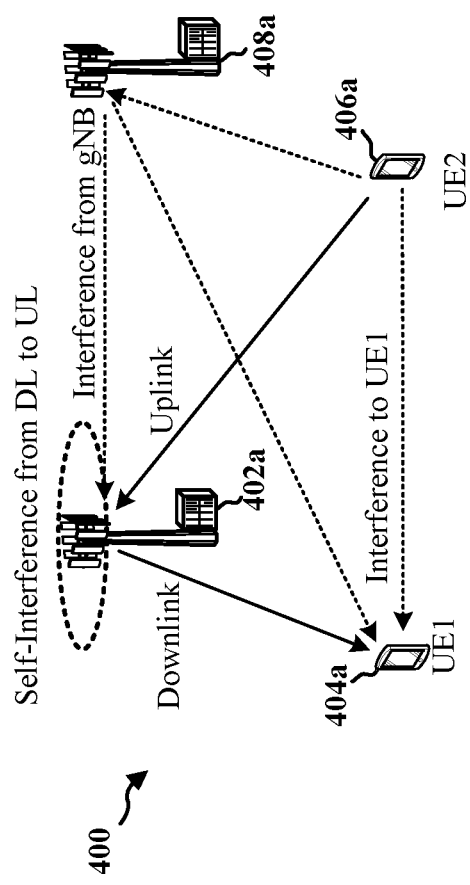
FIGS. 4A, 4B, and 4C illustrate exemplary modes of FD communication.
Figure 4C:
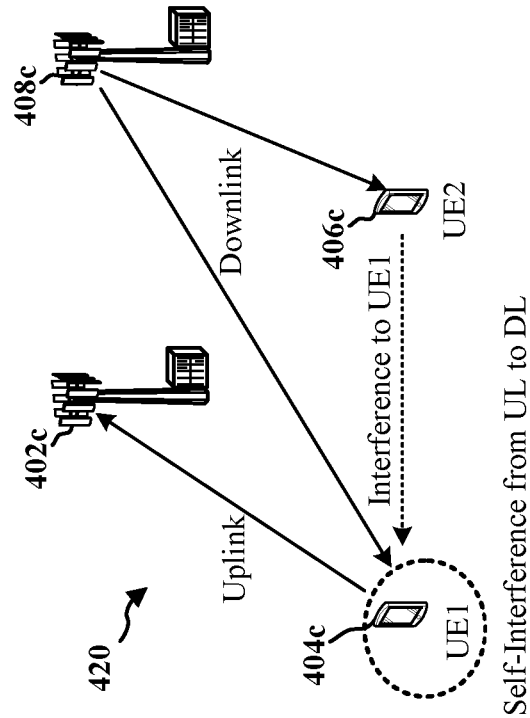
Figure 4B:
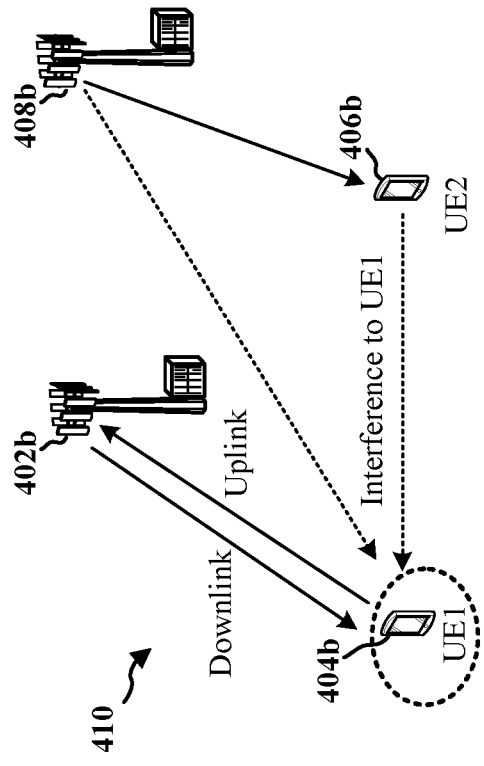

FIGS. 4A-4C illustrate modes of FD communication. FD communication is a wireless communication method that supports simultaneous transmission and reception of information over a same frequency band. In this manner, spectral efficiency can be improved over HD communication, which only supports transmission or reception of information in one direction at a time. Due to the simultaneous Tx/Rx nature of FD communication, a UE or a BS may experience self-interference caused by signal leakage from its local transmitter to its local receiver. In addition, the UE or BS could likewise experience interference from other devices, such as transmissions from a second UE or a second BS. Such interference (e.g., self-interference or interference caused by other devices) may impact a quality of information communicated via the signal, or even lead to a loss of the information altogether.

FIG. 4A shows a first configuration 400 in which a first BS 402a is in communication with a first UE 404a and a second UE 406a. The first BS 402a is a FD BS, whereas the first UE 404a and the second UE 406a can be configured as either a HD UE or a FD UE. The second UE 406a can transmit a first signal in UL resources to the first BS 402a as well as to other BSs, such as a second BS 408a in proximity to the second UE 406a. The first BS 402a and the second BS 408a can be configured as either an eNB or a gNB. In FIG. 4A, the first BS 402*a* transmits a second signal in DL resources to the first UE 404*a* concurrently with receiving the first signal in UL resources from the second UE 406*a*. Accordingly, self-interference may occur at the first BS 402*a* as a result of the second signal and the first signal being communicated simultaneously. Further interference may occur at the first BS 402*a* via signals emitted from the second BS 408*a*. Interference may also occur at the first UE 404*a* based on such signals emitted from the second BS 408*a* as well as from UE-based signals emitted by the second UE 406*a*.

FIG. 4B shows a second configuration 410 in which a first BS 402*b* is in communication with a first UE 404*b*. The first BS 402*b* is a FD BS and the first UE 404*b* is a FD UE. That is, the first BS 402*b* can receive a first signal in UL resources from the first UE 406*b* concurrently with transmitting a second signal in DL resources to the first UE 404*b*; and the first UE 404*b* can receive the second signal in DL resources from the first BS 402*b* concurrently with transmitting the first signal in UL resources to the first BS 402*b*. Accordingly, self-interference may occur at either or both of the first BS 402*b* and/or the first UE 404*b* as a result of the first signal and the second signal being simultaneously communicated between the first BS 402*b* and the first UE 404*b*. Further interference may also occur at the first UE 404*b* based on one or more signals emitted from a second UE 406*b* and/or a second BS 408*b* in proximity to the first UE 404*b*. The first BS 402*b* and the second BS 408*b* can be configured as either an eNB or a gNB.

FIG. 4C shows a third configuration 420 in which a first UE 404*c* is in communication with a first BS 402*c* and a second BS 408*c*. The first UE 404*c* is a FD UE for which the first BS 402*c* and the second BS 408*c* serve as multiple transmission and reception points (multi-TRPs) for UL and DL resources. In an example, the second BS 408*c* may be in communication with a second UE 406*c* and transmit further DL resources thereto. In FIG. 4C, the first UE 404*c* is configured to transmit an a first signal in UL resources to the first BS 402*c* concurrently with receiving a second signal in DL resources from the second BS 408*c*. Accordingly, self-interference may occur at the first UE 404*c* as a result of the first signal and the second signal being communicated simultaneously. Further interference may also occur at the first UE 404*c* via UE-based signals emitted from the second UE 406*c*.

Figure 5C:
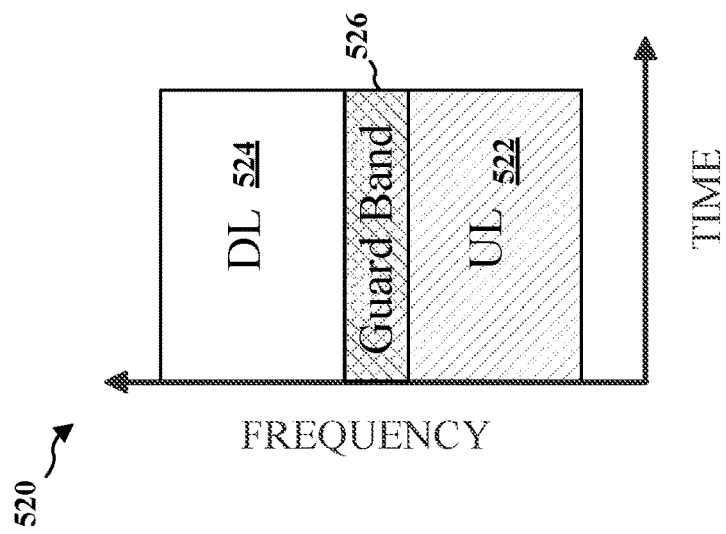
FIGS. 5A, 5B, and 5C illustrate examples of FD resources.
Figure 5B:
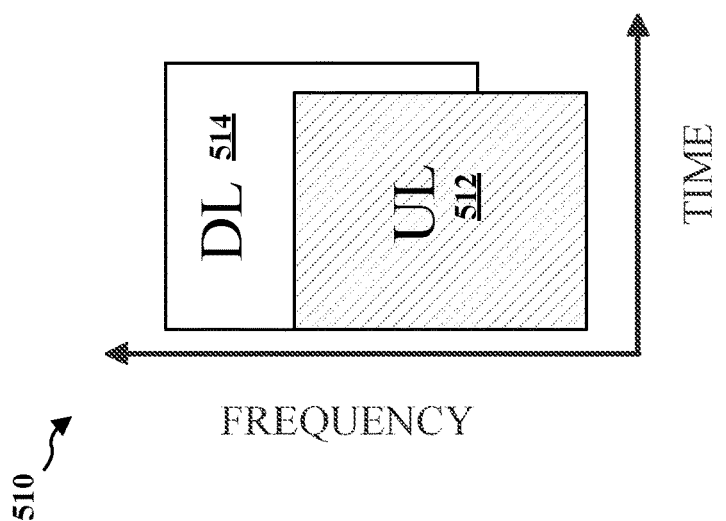
Figure 5A:
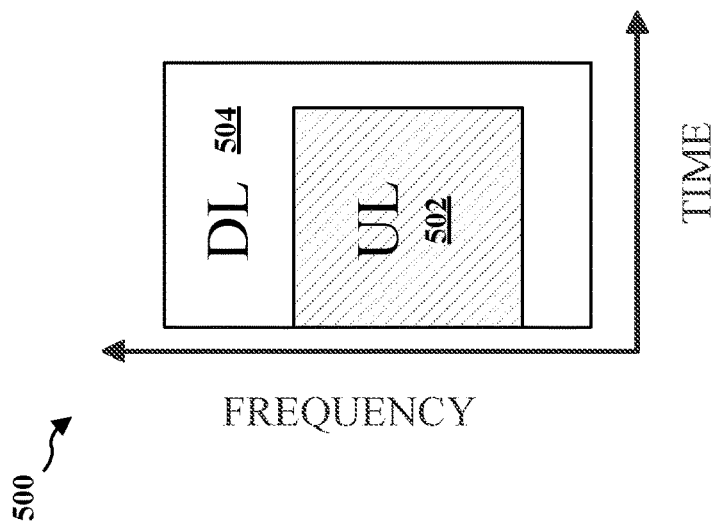

FIGS. 5A-5B illustrate a first example 500 and a second example 510 of resources that are in-band full duplex (IBFD); and FIG. 5C illustrates a third example 520 of resources that are sub-band flexible division duplex (sub-band FDD). In general, FD operations can be grouped into these two categories (i.e., IBFD and sub-band FDD). In IBFD, signals are transmitted and received at a same time and frequency. As shown in the first example 500, a time and a frequency of a UL band 502 may fully overlap with a time and a frequency of a DL band 504; or as alternatively shown in the second example 510, a time and a frequency of UL band 512 may partially overlap with a time and a frequency of DL band 514. In either case, the FD operations of FIGS. 5A-5B correspond to IBFD.

IBFD is in contrast to sub-band FDD, illustrated in FIG. 5C, where a UL band 522 and a DL band 524 (while still transmitted and received at a same time) are transmitted and received at different frequencies. In particular, the DL band 524 is separated from the UL band 522 in the frequency domain either by a guard band 526 or by utilizing a UL band and a DL band that are immediately adjacent to each other, in which a width of any corresponding guard band would be 0. Given that output signals from a UE transmitter may have a leakage that extends outside the UL band 522, having a guard band of some width can be advantageous for reducing interference between the UL resources and the DL resources. Sub-band FDD may also be referred to as "flexible duplex".

FIGS. 6A-6B illustrate exemplary configurations (600 and 610) of frequency division duplex (FDD) BSs in communication with HD UEs and FD UEs, respectively, as well as exemplary subframe arrangements (602 and 612) that may correspond to the configurations (600 and 610). The subframe arrangements (602 and 612) provide flexibility in DL and UL operations in time (e.g., across slots) and across different UEs. Time is represented across the subframes in the horizontal direction and frequency is represent in the vertical direction. The BS may provide a simultaneous PDSCH/PUSCH grant at a same subframe or slot for different UEs (e.g., HD UEs) and/or a simultaneous UL/DL grant for FD UEs. In a configuration, the UEs may need to change UL transmission and DL reception bandwidth parts (BWPs) between slots in minimal latency. A SRS may provide full reciprocity by covering the whole DL BWP or partial reciprocity by covering a part of the DL BWP.

Two different PDSCH/PUSCH mapping types (e.g., Type A and Type B) are utilized for UL and DL DMRS allocation in sub-band FDD operations. In Type A, a location of the DMRS is fixed to symbol 2 or symbol 3 of the allocation, regardless of a starting time and length of the PDSCH. Further, the PDSCH starting symbol is from 0 to 3 and the PUSCH starting symbol is 0. In Type B, the DMRS location is fixed to the first symbol of the allocation for the PDSCH, the starting symbol for the PDSCH may be from 0-12, and the starting symbol of the PUSCH may be from 0-13. While such conditions are considered during selection of a mapping type, strict use of Type A or Type B mapping provides some inflexibility in terms of DMRS allocations.

Figure 7:
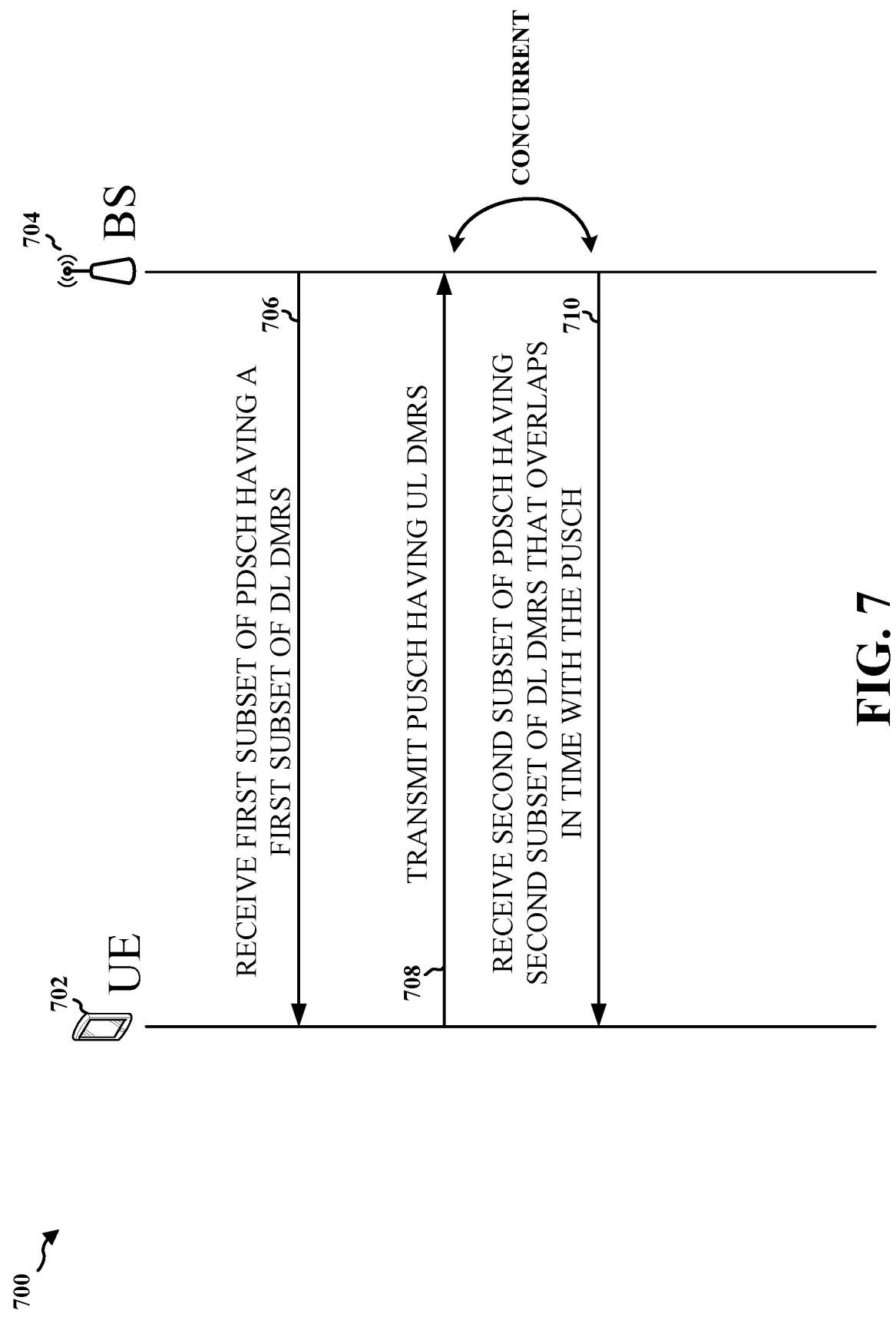
FIG. 7 is a call flow diagram illustrating communications between a UE and a BS.

FIG. 7 is a call flow diagram 700 illustrating communications between a UE 702 and a BS 704. FIGS. 8A-8C illustrate DMRS arrangements with respect to PDSCH/PUSCH allocations, where the DMRS is used for measuring a channel quality based on an estimated channel covariance matrix.

At 706, the UE 702 receives a first subset of a PDSCH in a first set of symbols of a subframe. The first set of symbols of the subframe are non-overlapping in time with an UL transmission from the UE 702 (e.g., the UL transmission at 708). In addition, the first subset of the PDSCH includes a first subset of DL DMRS. At 708, the UE 702 transmits a PUSCH to the BS 704 in a second set of symbols of the subframe. The second set of symbols of the subframe are overlapping in time with a DL reception (e.g., the DL reception at 710). The PUSCH from the UE in the second set of symbols includes UL DMRS. At 710, the UE 702 receives, concurrently with transmission of the PUSCH, a second subset of a PDSCH in the second set of symbols. The second subset of the PDSCH include a second subset of DL DMRS.

In FIG. 8A, diagram 800 includes PDSCH in a DL transmission 806 that is of Type A, as a DL DMRS 808 is located in symbol 2, as well as PUSCH in an UL transmission 802 that is of Type B, as an UL DMRS 804 is located in the first symbol of the allocation. In diagram 800, the DL DMRS 808 in symbol 2 does not overlap in time with the PUSCH, but may then be used to decode other symbols (e.g., symbol 4) that do overlap in time with the PUSCH. As a result, the DL DMRS 808 in symbol 2 does not capture any leakage from the UL transmission 802, since the UL channel is clear at symbol 2 before the UL transmission 802 begins. Therefore, if used to decode symbol 4 of the DL transmission 806, for example, which may receive leakage from the UL transmission 802, the decoding processes may be adversely affected and result in an inaccurate estimation of the channel. In continuing with the foregoing example, the inaccurate estimate of the channel would continue in the diagram 800 at least until symbol 6, where a second DL DMRS 810 may capture the leakage from the UL transmission 802 and properly decode symbols 7 and 8 based on the captured leakage. However, in symbol 9 of the diagram 800, a reverse issue is encountered in that the UL channel is once again clear but the second DL DMRS 810 used to decode the PDSCH in symbol 9 is configured in view of the previously captured leakage. Thus, inaccuracies in channel estimation may once again arise at symbol 9 until a third DL DMRS 812, such as that incorporated in symbol 10, is configured based on the subsequently cleared portion of the UL channel. Accordingly, alignment of the UL DMRS 804 with a DL DMRS (e.g., DL DMRS 810) can provide a more accurate estimation of the channel than having the DL DMRS aligned with only the PUSCH.

It is to be appreciated from the foregoing, however, that the DMRS does not need to decode the PDSCH/PUCCH on a symbol-by-symbol basis. Alternatively, the DMRS may be configured to collectively decode PDSCH/PUCCH for a group of symbols. For example, the first DL DMRS 808 may be configured to decode the PDSCH in a first group of symbols from 1-3, the second DL DMRS 810 may be configured to decode PDSCH in a second group of symbols from 4-8, and the third DL DMRS 812 may be configured to decode PDSCH in a third group of symbols from 9-13. In this example, there is no mismatch between configurations of the DMRSs and the PDSCH that the DMRSs decode, as such "groups" of symbols are in proper alignment with the UL transmission 802. That is, inaccuracies in channel estimations arise when there is a mismatch in the DMRS configuration with the UL channel. Thus, when a DL DMRS is guaranteed to be within a range of symbols spanned by the UL transmission 802, the symbol for which the DL DMRS occupies does not have to be the first symbol of the UL transmission 802 (e.g., the symbol that includes the UL DMRS 804). However, from an implementation standpoint, the decoding process may be facilitated by aligning the DL DMRS with the first symbol of the UL transmission 802 so that decoding can begin immediately, rather than at a subsequent symbol in time.

In FIG. 8B, a second diagram 820 illustrates an UL DMRS 824 incorporated in an UL transmission 822 where the UL DMRS 824 is aligned with a DL DMRS 828 incorporated in a DL transmission 826. The alignment between the UL DMRS 824 and the DL DMRS 828 captures self-interference from the UL transmission 822 such that the DL DMRS 828 is properly configured to decode corresponding PDSCH in the DL transmission 826. In cases where a mismatch is identified, a UE (e.g., the UE 702) is configured to align the UL DMRS 824 so that it occupies a same symbol as the DL DMRS 828 received from a BS (e.g., the BS 704).

When the UL and the DL are of a same length, a same DMRS may be used to decode the PDSCH for the entire transmission since the DL would be under continuous interference from the UL. As shown in the second diagram 820, however, the UL transmission 822 is shorter than the DL transmission 826. In this case, a non-zero power reference signal (nZP-RS) may be transmitted from either the UE 702 or the BS 704 to capture the channel covariance matrix (Rnn) or an extra DL DMRS 830 may be inserted into the DL transmission 826 by the BS 704 to measure the portion of the channel that is mismatched with the UL transmission 822. In the diagram 820, the extra DL DMRS 830 is inserted at symbol 10 to measure the portion of the channel where there is no interference from the UL transmission 822. If this configuration were reversed such that the DL DMRS 828 overlapped with the clear portion of the UL channel and not with the UL transmission 822, the extra DL DMRS 830 could likewise be inserted by the BS 704 into a symbol where interference occurs from the UL transmission 822 so that the extra DL DMRS 830 aligns with the UL transmission 822 for measuring the interference portion of the channel. In this manner, placement of the extra DL DMRS may be determined based only on how the DL and the UL allocations align. For example, if the UE 702 is initially configured to transmit the UL DMRS 824 in symbol 3 but determines that the DL DMRS 828 will be received in symbol 2, the UE 702 may reposition the UL DMRS 824 so that it also occupies symbol 3.

The DL DMRS 828 that overlaps in time with the UL transmission 822 may occupy a same symbol as the first symbol in the UL transmission 822 (e.g., symbol 2 of the second diagram 820), although as noted above the DL DMRS 828 does not have to occupy the first symbol of the UL transmission 822. Accordingly, the DL DMRS 828 received by the UE 702 via the DL transmission 826 can have self-interference incorporated therein to facilitate channel estimation by the UE 702 when the UE 702 is transmitting concurrently with reception of the DL. Alignment of the UL transmission 822 with the DL DMRS 828 allows self-interference to be incorporated into the DL DMRS 828; then, if the UL transmission 822 is also shorter than the DL transmission 826, the BS 704 may insert an extra DL DMRS 830 into the portion of the DL transmission 826 that is mismatched with the UL transmission 822.

A configuration of the DL DMRS 828 (and, if needed, the extra DL DMRS 830) may be implicitly signaled based on the DL and the UL allocations. That is, the UE 702 and the BS 704 may have a predefined set of rules that indicate based on such allocations, which locations the PDSCH and the PDSCH are to occupy. For example, in the second diagram 820, the UE 702 may be configured with PDSCH in symbols 1-13 and PUSCH in symbols 2-6. Based on this configuration, the DL DMRS 828 may be incorporated in symbol 2 to align with the UL DMRS 824 and the extra DL DMRS 830 may be incorporated in a symbol that is mismatched with the UL transmission 822 to align with the clear portion of the UL channel. In a further example, the UE 702 may be configured with PDSCH and PUSCH in all symbols from 1-13, where the DL and the UL allocations both have PDCCH in symbol 0 that maps the type of the DMRS. Thus, if Type A is mapped, the UE 702 can determine that the DL DMRS 828 is in symbol 2 and thereby align the UL DMRS 824 with symbol 2.

In FIG. 8C, a third diagram 840 illustrates a reformatted table for UL/DL DMRS designed for slots that include two duplexing modes. More specifically, the table is design based not only on the overlapping portion of the UL/DL allocation (e.g., the FD portion), but also on the non-overlapping/mismatched portion of the UL/DL allocation (e.g., the HD portion). Further, the layout of the table may be configured such that the DMRS allocation is optimized in view of the UL allocation pattern without compromising the channel covariance matrix (Rnn). In cases where there is no UL allocation in the slot, a legacy design or a different design may be utilized given that there is no FD operations. The legacy design can be a subset of the different design, which is based on zero allocation for the PUSCH (i.e., no symbols are allocated for the PUSCH).

Figure 9:
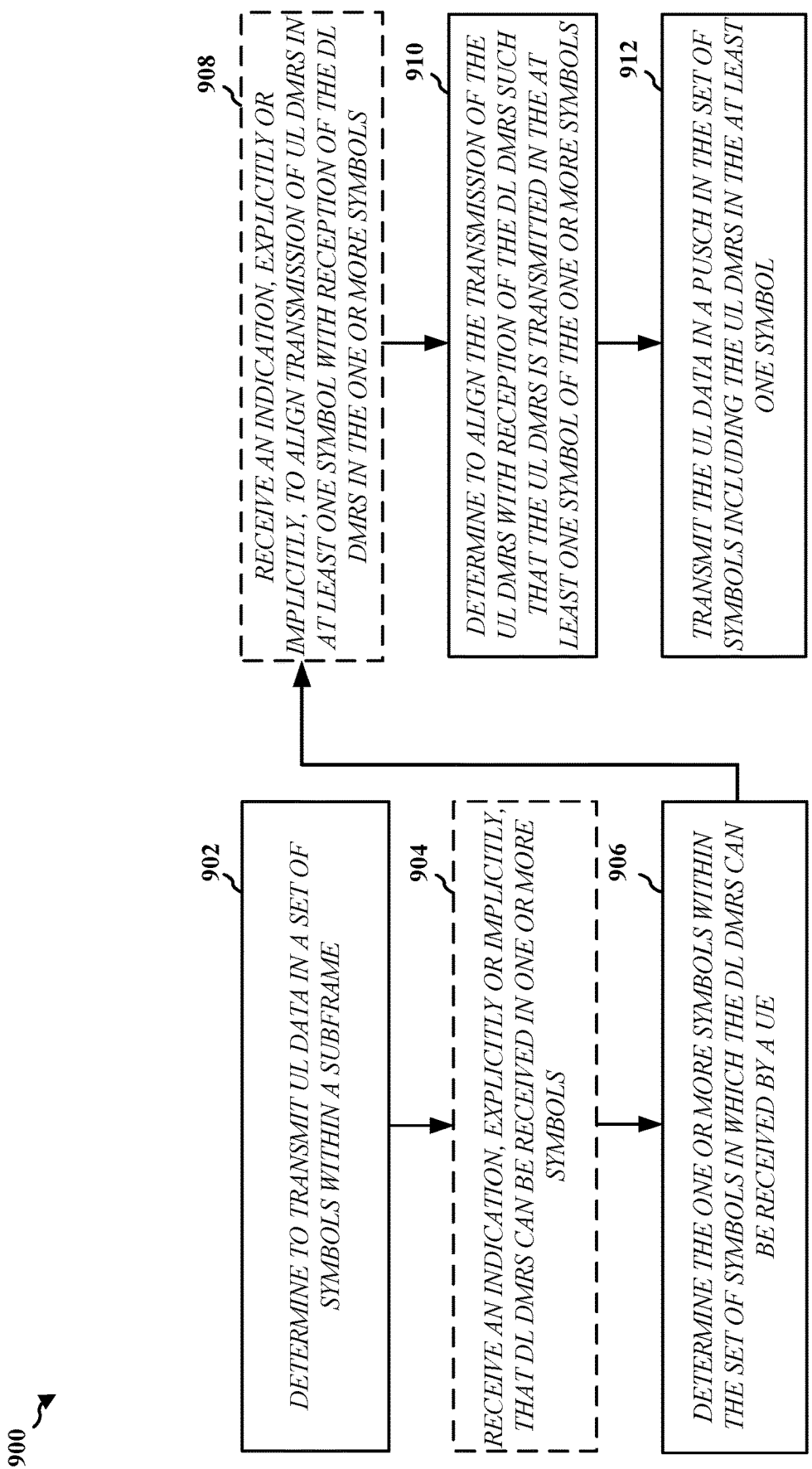
FIG. 9 is a flowchart of a method of wireless communication of a wireless device at a UE.

FIG. 9 is a flowchart 900 of a method of wireless communication. The method may be performed by a UE (e.g., the UE 702), which may include the memory 360 and which may be the entire UE 702 or a component of the UE 702, such as the TX processor 368, the RX processor 356, and/or the controller/processor 359).

At 902, the UE 702 determines to transmit UL data in a set of symbols within a subframe. For example, 902 may be performed by the UE 702 prior to communication 708 and/or communication 706.

At 904, the UE 702 receives an indication, explicitly or implicitly, that DL DMRS can be received by the wireless device in one or more symbols. For example, 904 may be performed by the UE 702 prior to communication 706.

At 906, the UE 702 determines the one or more symbols within the set of symbols in which DL DMRS can be received by the UE 702. For example, 906 may be performed by the UE 702 prior to communication 706.

At 908, the UE receives an indication, explicitly or implicitly, to align transmission of UL DMRS in at least one symbol with reception of the DL DMRS in the one or more symbols. For example, 908 may be performed by the UE 702 between communication 706 and communication 708.

At 910, the UE 702 determines to align the transmission of the UL DMRS with reception of the DL DMRS such that the UL DMRS is transmitted in the at least one symbol of the one or more symbols. For example, 910 may be performed by the UE 702 between communication 706 and communication 708.

At 912, the UE 702 transmits the UL data in a PUSCH in the set of symbols including the UL DMRS in the at least one symbol. For example, 912 may be performed by the UE 702 via communication 708. The at least one symbol may be a first symbol in time of the set of symbols.

Figure 10:
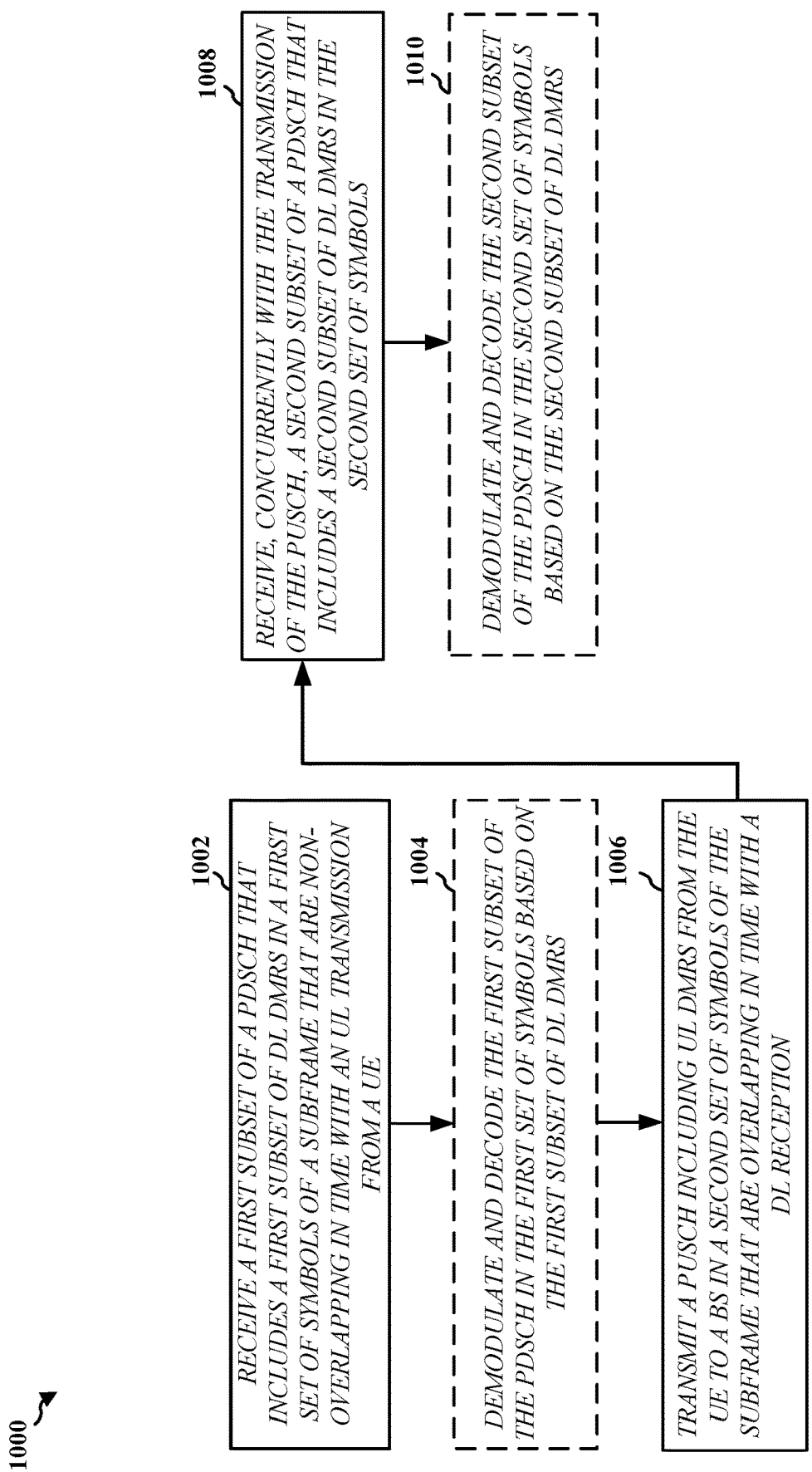
FIG. 10 is a flowchart of a method of wireless communication of a wireless device at a UE.

FIG. 10 is a flowchart 1000 of a method of wireless communication. The method may be performed by a UE (e.g., the UE 702), which may include the memory 360 and which may be the entire UE 702 or a component of the UE 702, such as the TX processor 368, the RX processor 356, and/or the controller/processor 359).

At 1002, the UE 702 receives a first subset of a PDSCH in a first set of symbols of a subframe. The first set of symbols of the subframe are non-overlapping in time with an UL transmission from the UE 702. The first subset of the PDSCH includes a first subset of DL DMRS. For example, 1002 may be performed by the UE 702 at communication 706.

At 1004, the UE 702 demodulates and decodes the first subset of the PDSCH in the first set of symbols based on the first subset of DL DMRS. For example, 1004 may be performed by the UE 702 between communication 706 and communication 708.

At 1006, the UE 702 transmits PUSCH to a BS (e.g., the BS 704) in a second set of symbols of the subframe. The second set of symbols of the subframe are overlapping in time with a DL reception (e.g., communication 710). The PUSCH from the UE 702 in the second set of symbols includes UL DMRS. For example, 1006 may be performed by the UE 702 at communication 708.

At 1008, the UE 702 receives, concurrently with the transmission of the PUSCH, a second subset of a PDSCH in the second set of symbols. The second subset of the PDSCH includes a second subset of DL DMRS. The second subset of DL DMRS may be in a same set of symbols as the UL DMRS within the second subset of symbols. Further, the second subset of DL DMRS may include self-interference from the transmitted UL DMRS. For example, 1008 may be performed by the UE 702 at communication 710.

At 1010, the UE 702 demodulates and decodes the second subset of the PDSCH in the second set of symbols based on the second subset of DL DMRS. For example, 1010 may be performed by the UE 702 subsequent to communication 710.

Figure 11:
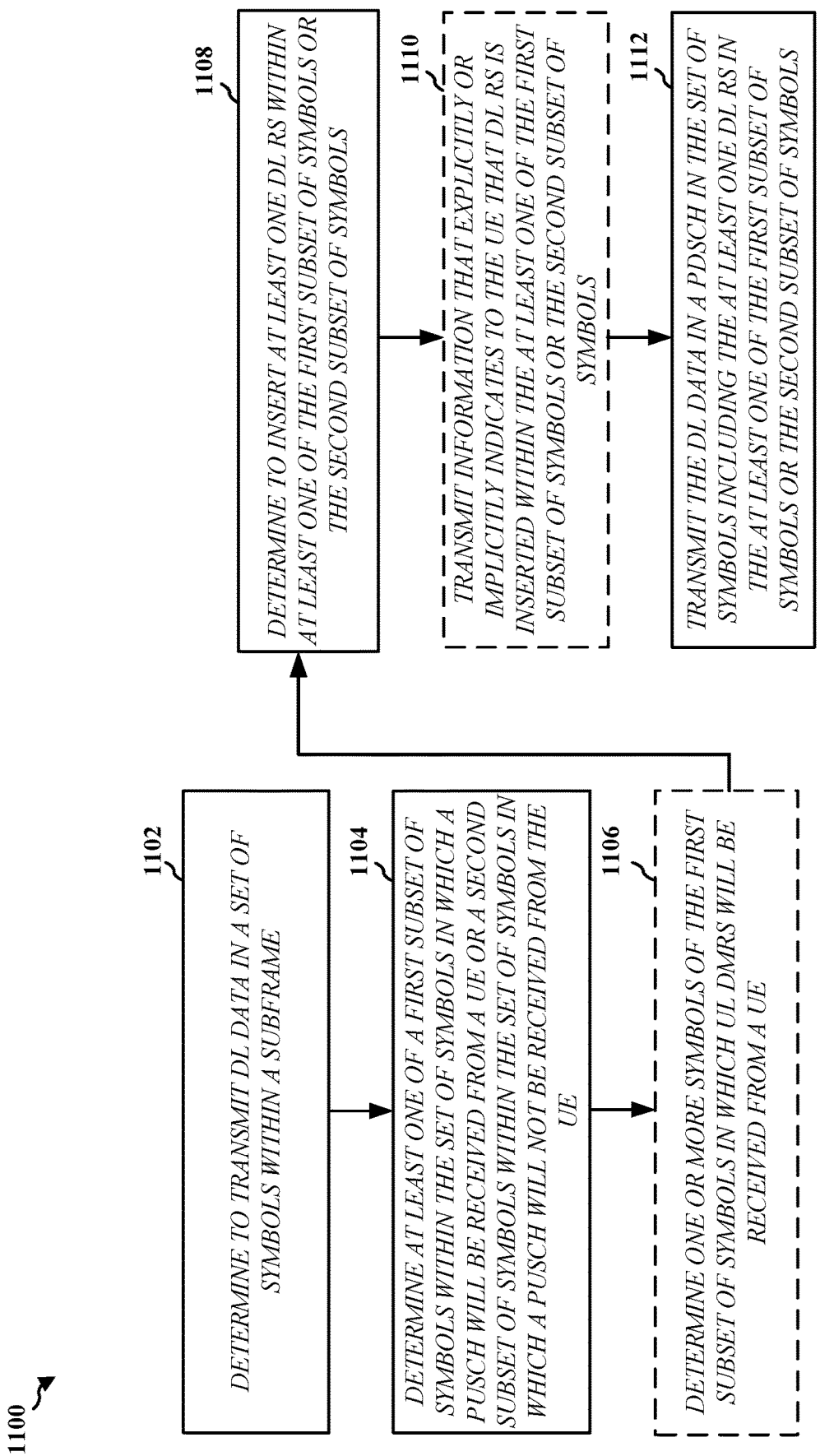
FIG. 11 is a flowchart of a method of wireless communication of a wireless device at a BS.

FIG. 11 is a flowchart 1100 of a method of wireless communication. The method may be performed by a BS (e.g., the BS 704), which may include the memory 376 and which may be the entire BS 704 or a component of the BS 704, such as the TX processor 316, the RX processor 370, and/or the controller/processor 375).

At 1102, the BS 704 determines to transmit DL data in a set of symbols within a subframe. For example, 1102 may be performed by the BS 704 prior to communication 706.

At 1104, the BS 704 determines at least one of a first subset of symbols within the set of symbols in which a PUSCH will be received from a UE (e.g., the UE 702) or a second subset of symbols within the set of symbols in which a PUSCH will not be received from the UE 702. For example, 1104 may be performed by the BS 704 prior to communication 706.

At 1106, the BS 704 determines one or more symbols of the first subset of symbols in which UL DMRS will be received from the UE 702. The wireless device may then determine to insert at least one DL RS within at least one symbol of the one or more symbols such that the inserted DL RS overlaps in time with the UL DMRS. For example, 1106 may be performed by the BS 704 prior to communication 706.

At 1108, the BS 704 determines to insert the at least one DL RS within at least one of the first subset of symbols or the second subset of symbols. The wireless device may determine to insert the at least one DL RS within the second subset of symbols upon a determination that DL RS is not included in the second subset of symbols; or the wireless device may determine to insert the at least one DL RS within the first subset of symbols upon a determination that DL RS is not included in the first subset of symbols. The determination by the wireless device to insert the at least one DL RS within the first subset of symbols may be to insert the at least one DL RS within a first symbol in time of the first subset of symbols. For example, 1108 may be performed by the BS 704 prior to communication 710.

At 1110, the BS 704 transmits information that explicitly or implicitly indicates to the UE 702 that the DL RS is inserted within the at least one of the first subset of symbols or the second subset of symbols. For example, 1110 may be performed by the BS 704 prior to communication 710.

At 1112, the BS 704 transmits the DL data in a PDSCH in the set of symbols including the at least one DL RS in the at least one of the first subset of symbols or the second subset of symbols. The DL RS may be one of a nZP-RS or DMRS. For example, 1112 may be performed by the BS 704 via the communication 710.

Figure 12:
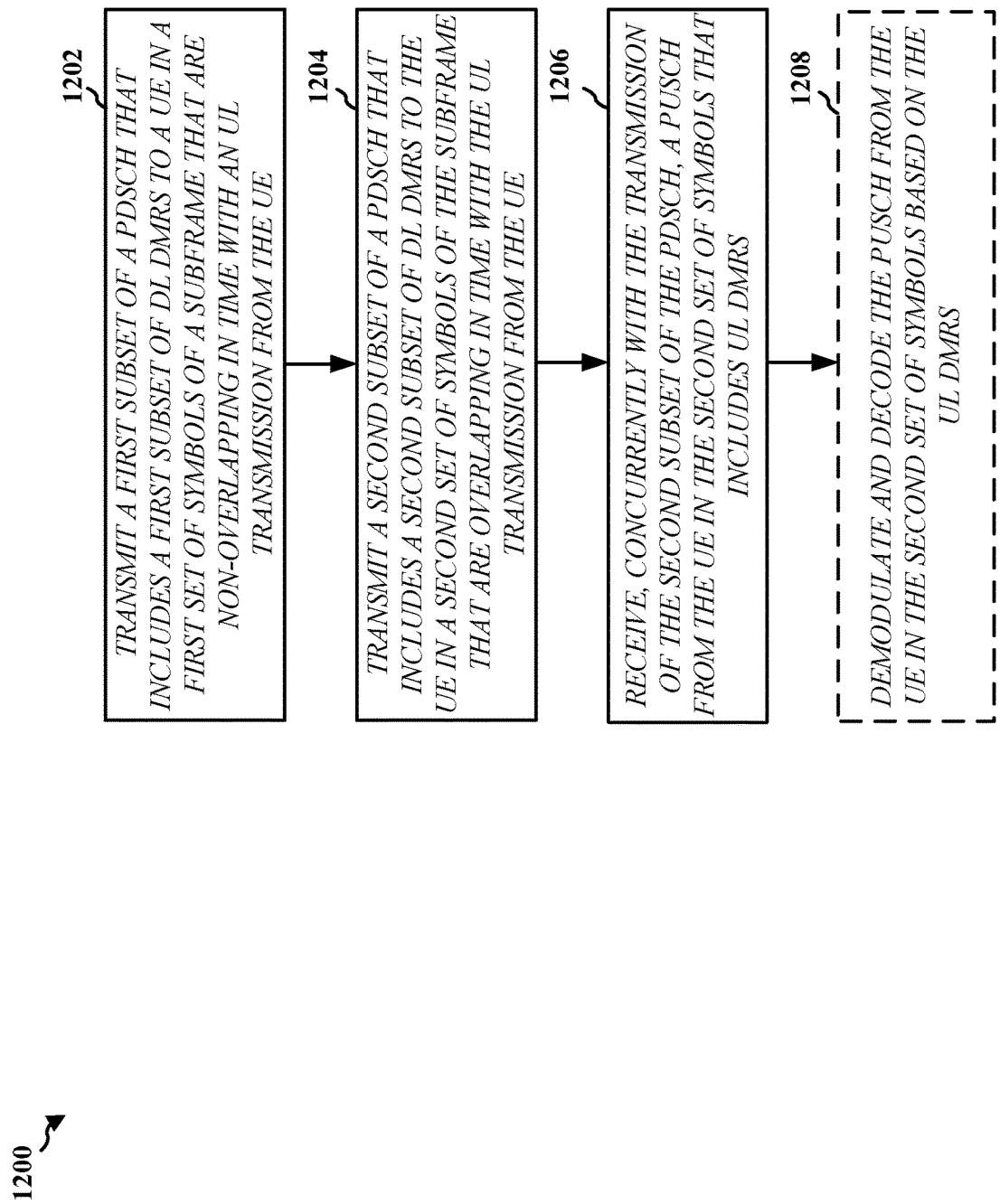
FIG. 12 is a flowchart of a method of wireless communication of a wireless device at a BS.

FIG. 12 is a flowchart 1200 of a method of wireless communication. The method may be performed by a BS (e.g., the BS 704), which may include the memory 376 and which may be the entire BS 704 or a component of the BS 704, such as the TX processor 316, the RX processor 370, and/or the controller/processor 375).

At 1202, the BS 704 transmits a first subset of a PDSCH to a UE (e.g., the UE 702) in a first set of symbols of a subframe. The first set of symbols of the subframe are non-overlapping in time with an UL transmission from the UE 702. The first subset of the PDSCH includes a first subset of DL DMRS. For example, 1202 may be performed by the BS 704 at communication 706.

At 1204, the BS 704 transmits a second subset of a PDSCH to the UE 702 in a second set of symbols of the subframe. The second set of symbols of the subframe are overlapping in time with the UL transmission from the UE 702. The second subset of the PDSCH includes a second subset of DL DMRS. For example, 1202 may be performed by the BS 704 at communication 710.

At 1206, the BS 704 receives, concurrently with the transmission of the second subset of the PDSCH, a PUSCH from the UE 702 in the second set of symbols. The PUSCH from the UE 702 in the second set of symbols includes UL DMRS. For example, 1202 may be performed by the BS 704 at communication 708. In configurations, the second subset of DL DMRS may be in a same set of symbols as the UL DMRS within the second set of symbols.

At 1208, the BS 704 demodulates and decodes the PUSCH from the UE 702 in the second set of symbols based on the UL DMRS. For example, 1202 may be performed by the BS 704 subsequent to communication 708.

Accordingly, when the DL DMRS does not overlap in time with the UL transmission, the BS 704 may insert a DL DMRS into a portion of the DL transmission that does overlap in time with the UL transmission. This allows the DL DMRS to capture the leakage from the UL transmission and properly decode corresponding PDSCH in the DL transmission. Further, the UE 702 may be configured to align the UL DMRS in the UL transmission with the DL DMRS in the DL transmission, as such alignment may provide improved estimations of channel properties over channel estimations performed with the DL DMRS aligned only with the PUSCH.

Figure 13:
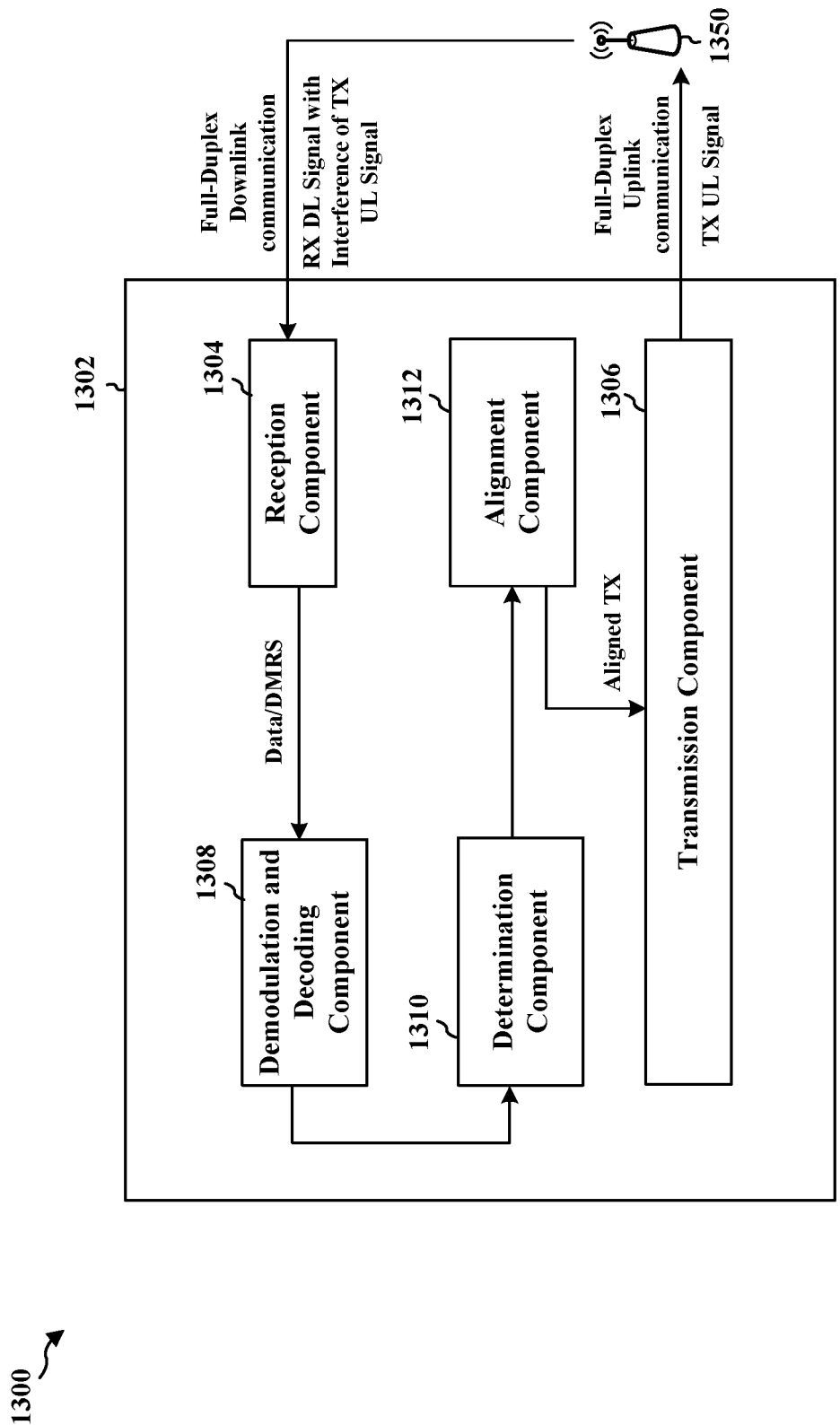
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., UE 104, 350, 404a, 404b, 404c, 406a, 406b, 406c, 702) in wireless communication with base station 1350.

The apparatus includes a reception component 1304 that receives downlink communication from the base station 1350. The reception component 1304 may be configured to receive signals and/or other information from other devices including, e.g., base station 1350. The signals/information received by the reception component 1304 may be provided to one or more components of the apparatus 1302 for further processing and use in performing various operations in accordance with the methods discussed supra including the processes of the aforementioned flowcharts 900 and 1000. Thus, via the reception component 1304, the apparatus 1302 and/or one or more components therein receive signals and/or other information (e.g., such as downlink data for the apparatus 1302 and/or other control signaling) from the base station 1350 as discussed supra and also discussed more specifically infra.

In some aspects, the reception component 1304 is configured to receive, from the BS in a first set of symbols of a subframe, a first subset of DL DMRS in a first subset of a PDSCH, e.g., as described in connection with block 1002 of FIG. 10. In some aspects, the first set of symbols is non-overlapping in time with an UL transmission from the UE. In some aspects, the reception component 1304 is also configured to receive, concurrently with communication of the PUSCH in the second set of symbols, a second subset of DL DMRS in a second subset of the PDSCH, e.g., as described in connection with block 1008 of FIG. 10. In some aspects, the second subset of DL DMRS is in a same set of symbols as the UL DMRS within the second set of symbols.

In some aspects, the second subset of DL DMRS includes self-interference from the transmitted UL DMRS. In some aspects, the reception component 1304 is also configured to receive an indication, explicitly or implicitly, that the DL DMRS can be received by the wireless device in the one or more symbols, e.g., as described in connection with block 904 of FIG. 9. In some aspects, the reception component 1304 is configured to receive, from the BS in the set of symbols, DL data in a PDSCH including the DL DMRS in the one or more symbols. In some aspects, the at least one symbol is a first symbol in time of the set of symbols.

The apparatus includes a demodulation and decoding component 1308 configured to demodulate and decode the first subset of the PDSCH in the first set of symbols based on the first subset of DL DMRS, e.g., as described in connection with block 1004 of FIG. 10. In some aspects, the demodulation and decoding component 1308 is also configured to demodulate and decode the second subset of the PDSCH in the second set of symbols based on the second subset of DL DMRS, e.g., as described in connection with block 1010 of FIG. 10.

The apparatus includes a determination component 1310 configured to determine to transmit UL data in a set of symbols within a subframe, e.g., as described in connection with block 902 of FIG. 9. In some aspects, the determination component 1310 is also configured to determine one or more symbols within the set of symbols in which DL DMRS can be received by the UE, e.g., as described in connection with block 906 of FIG. 9.

The apparatus includes an alignment component 1312 configured to receive, through the reception component 1304, an indication, explicitly or implicitly, to align transmission of the UL DMRS in the at least one symbol with reception of the DL DMRS in the one or more symbols, e.g., as described in connection with block 908 of FIG. 9. In some aspects, the alignment component 1312 is also configured to determine to align a transmission of UL DMRS with reception of the DL DMRS such that the UL DMRS is transmitted in at least one symbol of the one or more symbols, e.g., as described in connection with block 910 of FIG. 9.

The apparatus includes a transmission component 1306 that transmits uplink communication to the base station 1350. The transmission component 1306 may be configured to transmit various messages to one or more external devices, e.g., including the base station 1350, in accordance with the methods disclosed herein. The messages/signals to be transmitted may be generated by one or more other components as discussed above, or the messages/signals to be transmitted may be generated by the transmission component 1306 under the direction/control of the one or more other components discussed supra. Thus, in various configurations, via the transmission component 1306, the apparatus 1302 and/or one or more components therein transmit signals and/or other information (e.g., such as uplink data, control messages and/or other signals) to external devices such as the base station 1350. In some aspects, the transmission component 1306 is configured to communicate, with a BS in the set of symbols, the UL data in a PUSCH including the UL DMRS in the at least one symbol. In some aspects, the apparatus may transmit, to the BS in a second set of symbols of the subframe, an UL DMRS in the PUSCH, wherein the second set of symbols is overlapping in time with a DL reception. In some aspects, the apparatus may communicate, with the BS in at least one symbol of a second set of symbols of the subframe, an UL DMRS in a PUSCH, wherein the second set of symbols is overlapping in time with a DL reception.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
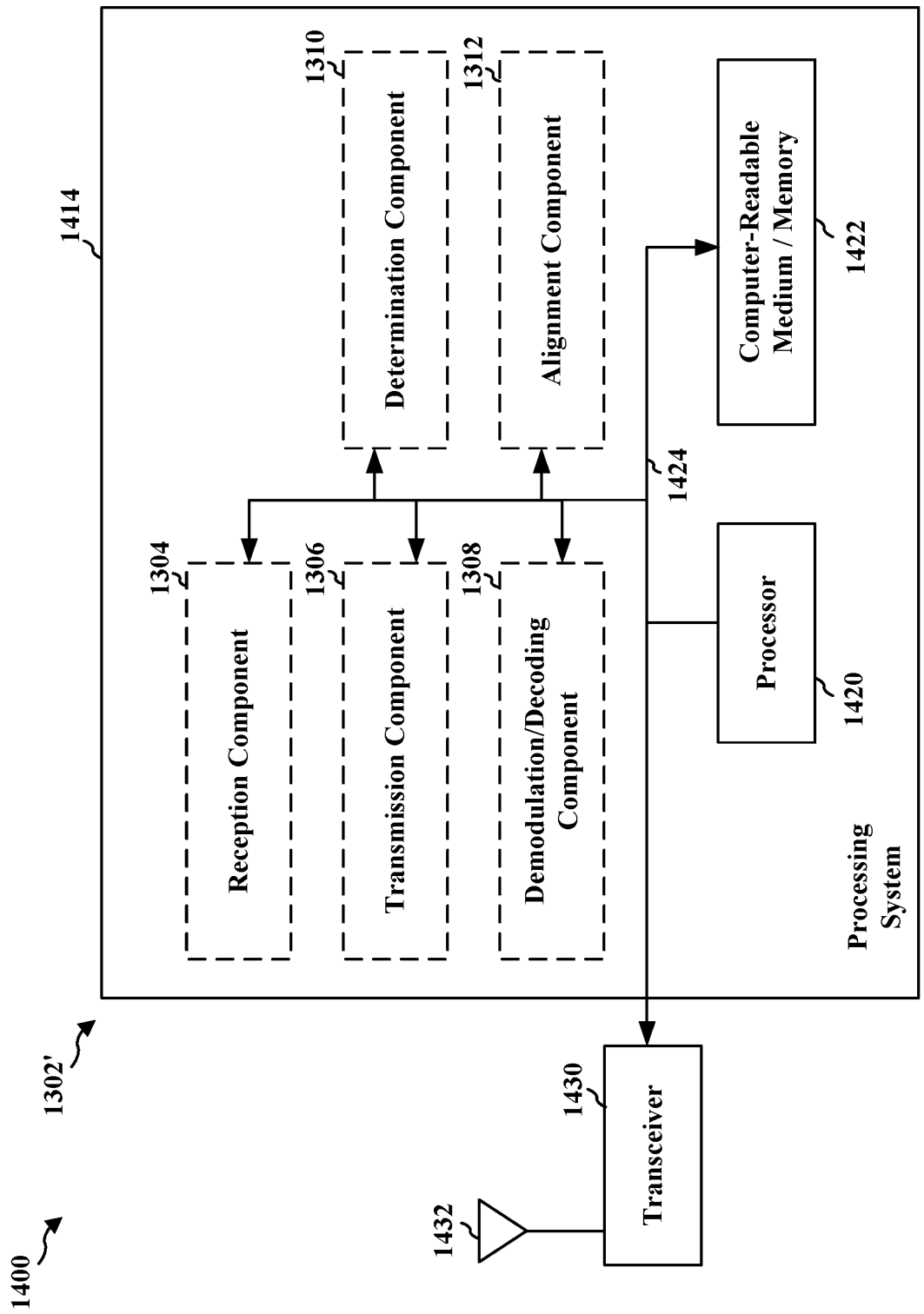
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1420, the components 1304, 1306, 1308, 1310, 1312, and the computer-readable medium/memory 1422. The bus 1424 may also link various other circuits such as timing sources, peripherals, voltage regulators, and power management circuits, which are well known in the art, and therefore, will not be described any further.

The processing system 1414 may be coupled to a transceiver 1430. The transceiver 1430 is coupled to one or more antennas 1432. The transceiver 1430 provides a means for communicating with various other apparatus over a transmission medium. The transceiver 1430 receives a signal from the one or more antennas 1432, extracts information from the received signal, and provides the extracted information to the processing system 1414, specifically the reception component 1304. In addition, the transceiver 1430 receives information from the processing system 1414, specifically the transmission component 1306, and based on the received information, generates a signal to be applied to the one or more antennas 1432. The processing system 1414 includes a processor 1420 coupled to a computer-readable medium/memory 1422. The processor 1420 is responsible for general processing, including the execution of software stored on the computer-readable medium/memory 1422. The software, when executed by the processor 1420, causes the processing system 1414 to perform the various functions described supra for any particular apparatus. The computer-readable medium/memory 1422 may also be used for storing data that is manipulated by the processor 1420 when executing software. The processing system 1414 further includes at least one of the components 1304, 1306, 1308, 1310, 1312. The components may be software components running in the processor 1420, resident/stored in the computer readable medium/memory 1422, one or more hardware components coupled to the processor 1420, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for transmitting a first signal in uplink (UL) resources to a first base station, means for receiving a second signal in downlink (DL) resources concurrently with the transmission of the first signal to the first base station, the received second signal including interference associated with the transmitted first signal, means for determining a level of the interference received in the second signal that is associated with the transmitted first signal, and means for transmitting information associated with the determined level of interference to the first base station. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
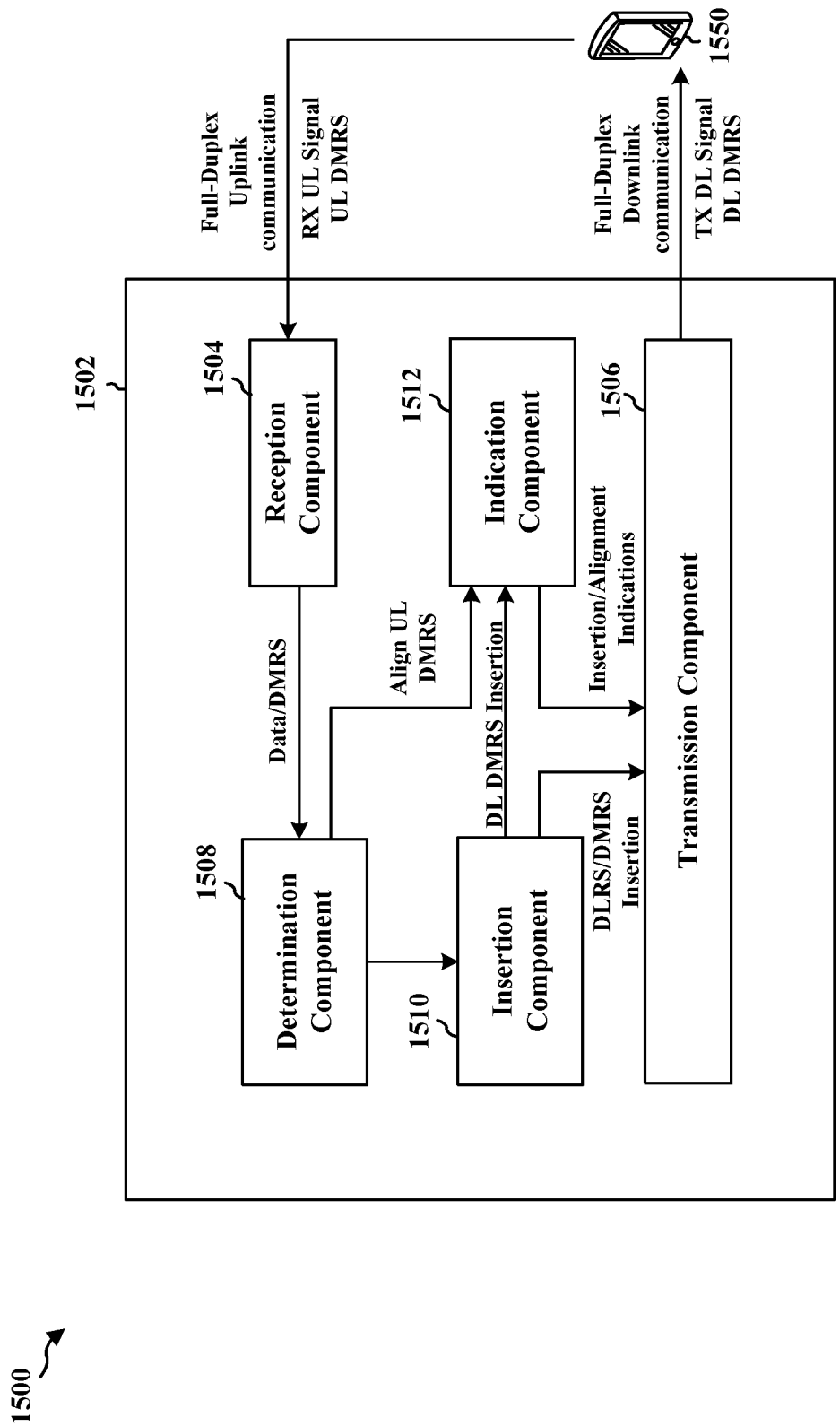
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a base station (e.g., BS 102, 180, 310, 402a, 402b, 402c, 408a, 408b, 408c, 704) in wireless communication with UE 1550.

The apparatus includes a determination component 1508 configured to determine to transmit DL data in a set of symbols within a subframe, e.g., as described in connection with block 1102 of FIG. 11. In some aspects, the determination component 1508 is configured to determine at least one of a first subset of symbols within the set of symbols in which a PUSCH is to be received from a UE or a second subset of symbols within the set of symbols in which a PUSCH is not to be received from the UE, e.g., as described in connection with block 1104 of FIG. 11. In some aspects, the determination component 1508 is configured to determine one or more symbols of the first subset of symbols in which an UL DMRS is to be received from the UE, e.g., as described in connection with block 1106 of FIG. 11.

The apparatus includes an insertion component 1510, in coordination with the insertion component 1510, is configured to determine to insert at least one DL RS within at least one of the first subset of symbols or the second subset of symbols, e.g., as described in connection with block 1108 of FIG. 11. In some aspects, the insertion component 1510 is also configured to determine whether the at least one DL RS is included in the second subset of symbols and determine, in coordination with the insertion component 1510, to insert the at least one DL RS within the second subset of symbols when the at least one DL RS is not included in the second subset of symbols. In some aspects, the insertion component 1510 is also configured to determine whether the at least one DL RS is included in the first subset of symbols and determine, in coordination with the insertion component 1510, to insert the at least one DL RS within the first subset of symbols when the at least one DL RS is not included in the first subset of symbols. In some aspects, the insertion component 1510, in coordination with the insertion component 1510, is configured to determine to insert the at least one DL RS within a first symbol in time of the first subset of symbols. In some aspects, the insertion component 1510, in coordination with the insertion component 1510, is configured to determine to insert the at least one DL RS within at least one symbol of the one or more symbols such that the inserted DL RS overlaps in time with the UL DMRS. In some aspects, the insertion component 1510, in coordination with the insertion component 1510, is configured to determine to insert the at least one DL RS within at least one symbol of the one or more symbols such that the inserted DL RS overlaps in time with the UL DMRS.

The apparatus includes an indication component 1512 configured to determine information that explicitly or implicitly indicates to the UE that the DL RS is inserted within the at least one of the first subset of symbols or the second subset of symbols.

The apparatus includes a transmission component 1506 that transmits uplink communication to the UE 1550. The transmission component 1506 may be configured to transmit various messages to one or more external devices, e.g., including the UE 1550, in accordance with the methods disclosed herein. The messages/signals to be transmitted may be generated by one or more other components as discussed above, or the messages/signals to be transmitted may be generated by the transmission component 1506 under the direction/control of the one or more other components discussed supra. Thus, in various configurations, via the transmission component 1506, the apparatus 1502 and/or one or more components therein transmit signals and/or other information (e.g., such as downlink data, control messages and/or other signals) to external devices such as the UE 1550. In some aspects, the transmission component 1506 is configured to transmit, to the UE in the set of symbols, the DL data in a PDSCH including the at least one DL RS in the at least one of the first subset of symbols or the second subset of symbols, e.g., as described in connection with block 1112 of FIG. 11. In some aspects, the transmission component 1506, in coordination with the indication component 1512, is configured to transmit, to the UE, the information that explicitly or implicitly indicates to the UE that the DL RS is inserted within the at least one of the first subset of symbols or the second subset of symbols, e.g., as described in connection with block 1110 of FIG. 11. In some aspects, the transmission component 1506 is configured to transmit, to a UE in a first set of symbols of a subframe, a first subset of DL DMRS in a first subset of a PDSCH, in which the first set of symbols is non-overlapping in time with an UL transmission from the UE, e.g., as described in connection with block 1202 of FIG. 12. In some aspects, the transmission component 1506 is also configured to transmit, to the UE in a second set of symbols of the subframe, a second subset of DL DMRS in a second subset of the PDSCH, wherein the second set of symbols is overlapping in time with the UL transmission from the UE, e.g., as described in connection with block 1204 of FIG. 12. In some aspects, the transmission component 1506, in coordination with the indication component 1512, is configured to transmit, to the UE, an indication, explicitly or implicitly, to align transmission of the UL DMRS in at least one symbol of the second set of symbols with reception of the second subset of DL DMRS in the second set of symbols.

The apparatus includes a reception component 1504 that receives uplink communication from the UE 1550. The reception component 1504 may be configured to receive signals and/or other information from other devices including, e.g., UE 1550. The signals/information received by the reception component 1504 may be provided to one or more components of the apparatus 1502 for further processing and use in performing various operations in accordance with the methods discussed supra including the processes of the aforementioned flowcharts 1100 and 1200. Thus, via the reception component 1504, the apparatus 1502 and/or one or more components therein receive signals and/or other information (e.g., such as uplink data for the apparatus 1502 and/or other control signaling) from the UE 1550 as discussed supra and also discussed more specifically infra. In some aspects, the reception component 1504 is configured to receive, from the UE in the second set of symbols, concurrently with transmission of the second subset of the PDSCH, an UL DMRS in a PUSCH, e.g., as described in connection with block 1206 of FIG. 12. In some aspects, the second subset of DL DMRS is in a same set of symbols as the UL DMRS within the second set of symbols. In some aspects, the second subset of DL DMRS includes self-interference of the UL DMRS. In some aspects, the reception component 1504 is configured to demodulate and decode the PUSCH based on the UL DMRS, e.g., as described in connection with block 1208 of FIG. 12.

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
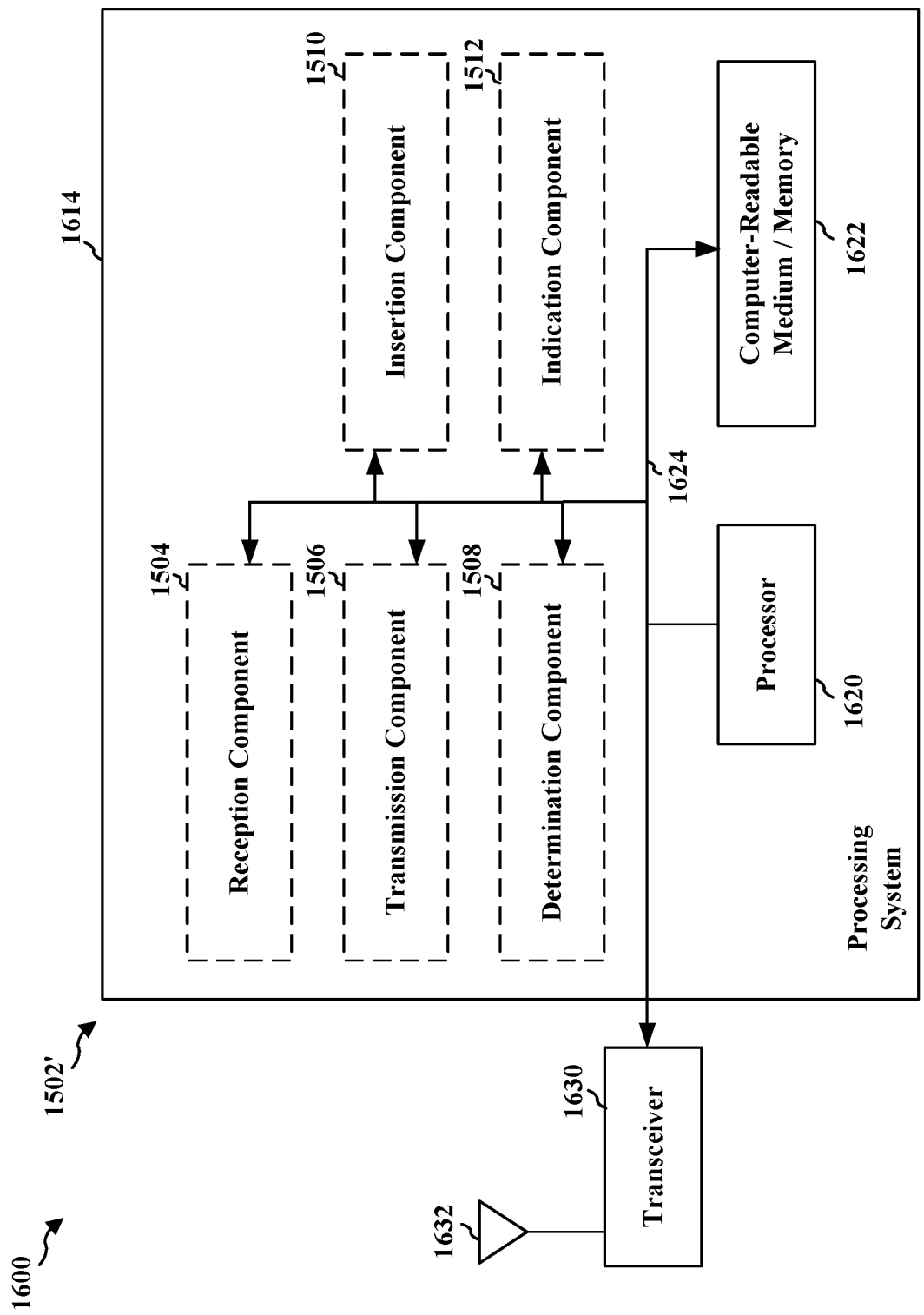
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1620, the components 1504, 1506, 1508, 1510, 1512, and the computer-readable medium/memory 1622. The bus 1624 may also link various other circuits such as timing sources, peripherals, voltage regulators, and power management circuits, which are well known in the art, and therefore, will not be described any further.

The processing system 1614 may be coupled to a transceiver 1630. The transceiver 1630 is coupled to one or more antennas 1632. The transceiver 1630 provides a means for communicating with various other apparatus over a transmission medium. The transceiver 1630 receives a signal from the one or more antennas 1632, extracts information from the received signal, and provides the extracted information to the processing system 1614, specifically the reception component 1504. In addition, the transceiver 1630 receives information from the processing system 1614, specifically the transmission component 1506, and based on the received information, generates a signal to be applied to the one or more antennas 1632. The processing system 1614 includes a processor 1620 coupled to a computer-readable medium/memory 1622. The processor 1620 is responsible for general processing, including the execution of software stored on the computer-readable medium/memory 1622. The software, when executed by the processor 1620, causes the processing system 1614 to perform the various functions described supra for any particular apparatus. The computer-readable medium/memory 1622 may also be used for storing data that is manipulated by the processor 1620 when executing software. The processing system 1614 further includes at least one of the components 1504, 1506, 1508, 1510, 1512. The components may be software components running in the processor 1620, resident/stored in the computer readable medium/memory 1622, one or more hardware components coupled to the processor 1620, or some combination thereof. The processing system 1614 may be a component of the UE

350 and may include the memory 360 and/or at least one of the TX processor 368, the RX processor 356, and the controller/processor 359.

In one configuration, the apparatus 1502/1502' for wireless communication includes means for transmitting a first signal in uplink (UL) resources to a first base station, means for receiving a second signal in downlink (DL) resources concurrently with the transmission of the first signal to the first base station, the received second signal including interference associated with the transmitted first signal, means for determining a level of the interference received in the second signal that is associated with the transmitted first signal, and means for transmitting information associated with the determined level of interference to the first base station. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following aspects are illustrative only and may be combined with aspects of other embodiments or teachings described herein, without limitation.

Aspect 1 is a method of wireless communication of a wireless device at a user equipment that includes determining to transmit uplink (UL) data in a set of symbols within a subframe; determining one or more symbols within the set of symbols in which downlink (DL) demodulation reference signals (DMRS) can be received by the UE; determining to align a transmission of UL DMRS with reception of the DL DMRS such that the UL DMRS is transmitted in at least one symbol of the one or more symbols; and communicating, with a base station (BS) in the set of symbols, the UL data in a physical uplink shared channel (PUSCH) including the UL DMRS in the at least one symbol.

In Aspect 2, the method of Aspect 1 further includes receiving, from the BS in a first set of symbols of the subframe, a first subset of DMRS in a first subset of a physical downlink shared channel (PDSCH), wherein the first set of symbols is non-overlapping in time with an uplink (UL) transmission from the UE.

In Aspect 3, the method of Aspect 1 or Aspect 2 further includes that the communicating the UL data in the PUSCH comprises: transmitting, to the BS in a second set of symbols of the subframe, an UL DMRS in the PUSCH, wherein the second set of symbols is overlapping in time with a DL reception.

In Aspect 4, the method of any of Aspects 1-3 further includes receiving, concurrently with communication of the PUSCH in the second set of symbols, a second subset of DL DMRS in a second subset of the PDSCH.

In Aspect 5, the method of any of Aspects 1-4 further includes that the second subset of DL DMRS is in a same set of symbols as the UL DMRS within the second set of symbols.

In Aspect 6, the method of any of Aspects 1-5 further includes that the second subset of DL DMRS includes self-interference from the transmitted UL DMRS.

In Aspect 7, the method of any of Aspects 1-6 further includes demodulating and decoding the first subset of the PDSCH in the first set of symbols based on the first subset of DL DMRS; and demodulating and decoding the second subset of the PDSCH in the second set of symbols based on the second subset of DL DMRS.

In Aspect 8, the method of any of Aspects 1-7 further includes that the at least one symbol is a first symbol in time of the set of symbols.

In Aspect 9, the method of any of Aspects 1-8 further includes receiving an indication, explicitly or implicitly, that the DL DMRS can be received by the wireless device in the one or more symbols.

In Aspect 10, the method of any of Aspects 1-9 further includes receiving an indication, explicitly or implicitly, to align transmission of the UL DMRS in the at least one symbol with reception of the DL DMRS in the one or more symbols.

In Aspect 11, the method of any of Aspects 1-10 further includes receiving, from the BS in the set of symbols, DL data in a physical downlink shared channel (PDSCH) including the DL DMRS in the one or more symbols.

Aspect 12 is a device including one or more processors and one or more memories in electronic communication with the one or more processors storing instructions executable by the one or more processors to cause the system or apparatus to implement a method as in any of Aspects 1 to 11.

Aspect 13 is a system or apparatus including means for implementing a method or realizing an apparatus as in any of Aspects 1 to 11.

Aspect 14 is a non-transitory computer readable medium storing instructions executable by one or more processors to cause the one or more processors to implement a method as in any of Aspects 1 to 11.

Aspect 15 is a method of wireless communication of a wireless device at a user equipment (UE) that includes receiving, from a base station (BS) in a first set of symbols of a subframe, a first subset of downlink (DL) demodulation reference signals (DMRS) in a first subset of a physical downlink shared channel (PDSCH), wherein the first set of symbols is non-overlapping in time with an uplink (UL) transmission from the UE; communicating, with the BS in at least one symbol of a second set of symbols of the subframe, an UL DMRS in a physical uplink shared channel (PUSCH), wherein the second set of symbols is overlapping in time with a DL reception; and receiving, from the BS in the second set of symbols, concurrently with communication of the PUSCH, a second subset of DL DMRS in a second subset of the PDSCH.

In Aspect 16, the method of Aspect 15 further includes that the second subset of DL DMRS is in a same set of symbols as the UL DMRS within the second set of symbols.

In Aspect 17, the method of Aspect 15 or Aspect 16 further includes that the second subset of DL DMRS comprises self-interference from the transmitted UL DMRS.

In Aspect 18, the method of any of Aspects 15-17 further includes demodulating and decoding the first subset of the PDSCH in the first set of symbols based on the first subset of DL DMRS; and demodulating and decoding the second subset of the PDSCH in the second set of symbols based on the second subset of DL DMRS.

In Aspect 19, the method of any of Aspects 15-18 further includes that the at least one symbol is a first symbol in time of the second set of symbols.

In Aspect 20, the method of any of Aspects 15-19 further includes receiving, from the BS, an indication, explicitly or implicitly, that the DL DMRS can be received by the wireless device in one or more of the first set of symbols or the second set of symbols.

In Aspect 21, the method of any of Aspects 15-20 further includes receiving, from the BS, an indication, explicitly or implicitly, to align transmission of the UL DMRS in the at least one symbol with reception of the second subset of DL DMRS in the second set of symbols.

Aspect 22 is a device including one or more processors and one or more memories in electronic communication with the one or more processors storing instructions executable by the one or more processors to cause the system or apparatus to implement a method as in any of Aspects 15 to 21.

Aspect 23 is a system or apparatus including means for implementing a method or realizing an apparatus as in any of Aspects 15 to 21.

Aspect 24 is a non-transitory computer readable medium storing instructions executable by one or more processors to cause the one or more processors to implement a method as in any of Aspects 15 to 21.

Aspect 25 is a method of wireless communication of a wireless device at a base station (BS) that includes determining to transmit downlink (DL) data in a set of symbols within a subframe; determining at least one of a first subset of symbols within the set of symbols in which a physical uplink shared channel (PUSCH) is to be received from a user equipment (UE) or a second subset of symbols within the set of symbols in which a PUSCH is not to be received from the UE; determining to insert at least one DL reference signal (RS) within at least one of the first subset of symbols or the second subset of symbols; and transmitting, to the UE in the set of symbols, the DL data in a physical downlink shared channel (PDSCH) including the at least one DL RS in the at least one of the first subset of symbols or the second subset of symbols.

In Aspect 26, the method of Aspect 25 further includes that the DL RS is one of non-zero-power RS (NZP-RS) or DMRS.

In Aspect 27, the method of Aspect 25 or Aspect 26 further includes that the determining to insert the at least one DL RS comprises: determining whether the at least one DL RS is included in the second subset of symbols; and determining to insert the at least one DL RS within the second subset of symbols when the at least one DL RS is not included in the second subset of symbols.

In Aspect 28, the method of any of Aspects 25-27 further includes that the determining to insert the at least one DL RS comprises: determining whether the at least one DL RS is included in the first subset of symbols; and determining to insert the at least one DL RS within the first subset of symbols when the at least one DL RS is not included in the first subset of symbols.

In Aspect 29, the method of any of Aspects 25-28 further includes that the determining to insert the at least one DL RS comprises determining to insert the at least one DL RS within a first symbol in time of the first subset of symbols.

In Aspect 30, the method of any of Aspects 25-29 further includes determining one or more symbols of the first subset of symbols in which an uplink (UL) DMRS is to be received from the UE, wherein the determining to insert the at least one DL RS comprises determining to insert the at least one DL RS within at least one symbol of the one or more symbols such that the inserted DL RS overlaps in time with the UL DMRS.

In Aspect 31, the method of any of Aspects 25-30 further includes transmitting, to the UE, information that explicitly or implicitly indicates to the UE that the DL RS is inserted within the at least one of the first subset of symbols or the second subset of symbols.

Aspect 32 is a device including one or more processors and one or more memories in electronic communication with the one or more processors storing instructions executable by the one or more processors to cause the system or apparatus to implement a method as in any of Aspects 25 to 31.

Aspect 33 is a system or apparatus including means for implementing a method or realizing an apparatus as in any of Aspects 25 to 31.

Aspect 34 is a non-transitory computer readable medium storing instructions executable by one or more processors to cause the one or more processors to implement a method as in any of Aspects 25 to 31.

Aspect 35 is a method of wireless communication of a wireless device at a base station (BS) that includes transmitting, to a user equipment (UE) in a first set of symbols of a subframe, a first subset of downlink (DL) demodulation reference signals (DMRS) in a first subset of a physical downlink shared channel (PDSCH), wherein the first set of symbols is non-overlapping in time with an uplink (UL) transmission from the UE; transmitting, to the UE in a second set of symbols of the subframe, a second subset of DL DMRS in a second subset of the PDSCH, wherein the second set of symbols is overlapping in time with the UL transmission from the UE; and receiving, from the UE in the second set of symbols, concurrently with transmission of the second subset of the PDSCH, an UL DMRS in a physical uplink shared channel (PUSCH).

In Aspect 36, the method of Aspect 35 further includes that the second subset of DL DMRS is in a same set of symbols as the UL DMRS within the second set of symbols.

In Aspect 37, the method of Aspect 35 or Aspect 36 further includes demodulating and decoding the PUSCH based on the UL DMRS.

In Aspect 38, the method of any of Aspects 35-37 further includes that the second subset of DL DMRS comprises self-interference of the UL DMRS.

In Aspect 39, the method of any of Aspects 35-38 further includes that transmitting, to the UE, an indication, explicitly or implicitly, to align transmission of the UL DMRS in at least one symbol of the second set of symbols with reception of the second subset of DL DMRS in the second set of symbols.

Aspect 40 is a device including one or more processors and one or more memories in electronic communication with the one or more processors storing instructions executable by the one or more processors to cause the system or apparatus to implement a method as in any of Aspects 35 to 39.

Aspect 41 is a system or apparatus including means for implementing a method or realizing an apparatus as in any of Aspects 35 to 39.

Aspect 42 is a non-transitory computer readable medium storing instructions executable by one or more processors to cause the one or more processors to implement a method as in any of Aspects 35 to 39.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by an apparatus, the method comprising:
    determining to transmit uplink (UL) data in a set of symbols within a subframe;
    determining one or more symbols within the set of symbols in which downlink (DL) demodulation reference signals (DMRS) can be received by the apparatus;
    determining to align a transmission of UL DMRS with reception of the DL DMRS such that the UL DMRS is transmitted in at least one symbol of the one or more symbols;
    receiving, from a base station (BS) in a first set of symbols of the subframe, a first subset of DMRS in a first subset of a physical downlink shared channel (PDSCH), wherein the first set of symbols is non-overlapping in time with an uplink (UL) transmission from the apparatus; and
    communicating, with the BS in the set of symbols, the UL data in a physical uplink shared channel (PUSCH) including the UL DMRS in the at least one symbol.

2. The method of claim 1, wherein the communicating the UL data in the PUSCH comprises:
    transmitting, to the BS in a second set of symbols of the subframe, an UL DMRS in the PUSCH, wherein the second set of symbols is overlapping in time with a DL reception.

3. The method of claim 2, further comprising:
    receiving, concurrently with communication of the PUSCH in the second set of symbols, a second subset of DL DMRS in a second subset of the PDSCH.

4. The method of claim 3, wherein the second subset of DL DMRS is in a same set of symbols as the UL DMRS within the second set of symbols.

5. The method of claim 3, wherein the second subset of DL DMRS includes self-interference from the transmitted UL DMRS.

6. The method of claim 3, further comprising:
    demodulating and decoding the first subset of the PDSCH in the first set of symbols based on the first subset of DL DMRS; and
    demodulating and decoding the second subset of the PDSCH in the second set of symbols based on the second subset of DL DMRS.

7. The method of claim 1, wherein the at least one symbol is a first symbol in time of the set of symbols.

8. The method of claim 1, further comprising receiving, from the BS, an indication, explicitly or implicitly, that the DL DMRS can be received by the apparatus in the one or more symbols.

9. The method of claim 1, further comprising receiving, from the BS, an indication, explicitly or implicitly, to align transmission of the UL DMRS in the at least one symbol with reception of the DL DMRS in the one or more symbols.

10. The method of claim 1, further comprising receiving, from the BS in the set of symbols, DL data in a physical downlink shared channel (PDSCH) including the DL DMRS in the one or more symbols.

11. An apparatus for wireless communication, the apparatus comprising:
    at least one processor; and
    a memory, coupled to the at least one processor, storing computer-executable code that when executed by the at least one processor, causes the apparatus to:
        determine to transmit uplink (UL) data in a set of symbols within a subframe;
        determine one or more symbols within the set of symbols in which downlink (DL) demodulation reference signals (DMRS) can be received by the apparatus;
        determine to align a transmission of UL DMRS with reception of the DL DMRS such that the UL DMRS is transmitted in at least one symbol of the one or more symbols;
        receive, from a base station (BS) in a first set of symbols of the subframe, a first subset of DL DMRS in a first subset of a physical downlink shared channel (PDSCH), wherein the first set of symbols is non-overlapping in time with an uplink (UL) transmission from the apparatus;
        communicate, with the BS in at least one symbol of a second set of symbols of the subframe, an UL DMRS in a physical uplink shared channel (PUSCH), wherein the second set of symbols is overlapping in time with a DL reception; and
        receive, from the BS in the second set of symbols, concurrently with communication of the PUSCH, a second subset of DL DMRS in a second subset of the PDSCH.

12. The apparatus of claim 11, wherein the second subset of DL DMRS is in a same set of symbols as the UL DMRS within the second set of symbols.

13. The apparatus of claim 12, wherein the second subset of DL DMRS comprises self-interference of the UL DMRS.

14. The apparatus of claim 11, wherein the code further causes the apparatus to:

demodulate and decode the first subset of the PDSCH in the first set of symbols based on the first subset of DL DMRS; and demodulate and decode the second subset of the PDSCH in the second set of symbols based on the second subset of DL DMRS.

15. The apparatus of claim 11, wherein the at least one symbol is a first symbol in time of the second set of symbols.

16. The apparatus of claim 11, wherein the code further causes the apparatus to receive, from the BS, an indication, explicitly or implicitly, that the DL DMRS can be received by the apparatus in one or more of the first set of symbols or the second set of symbols.

17. The apparatus of claim 11, wherein the code further causes the apparatus to receive, from the BS, an indication, explicitly or implicitly, to align transmission of the UL DMRS in the at least one symbol with reception of the second subset of DL DMRS in the second set of symbols.

18. A method of wireless communication performed by an apparatus, comprising:

determining to transmit downlink (DL) data in a set of symbols within a subframe;

determining at least one of a first subset of symbols within the set of symbols in which a physical uplink shared channel (PUSCH) is to be received from a user equipment (UE) or a second subset of symbols within the set of symbols in which a PUSCH is not to be received from the UE;

determining whether at least one DL reference signal (RS) is included in the second subset of symbols or is included in the first subset of symbols;

determining to insert the at least one DL RS within the second subset of symbols when the at least one DL RS is not included in the second subset of symbols or determining to insert the at least one DL RS within the first subset of symbols when the at least one DL RS is not included in the first subset of symbols; and transmitting, to the UE in the set of symbols, the DL data in a physical downlink shared channel (PDSCH) including the at least one DL RS in the at least one of the first subset of symbols or the second subset of symbols.

19. The method of claim 18, wherein the DL RS is one of non-zero-power RS (NZP-RS) or DMRS.

20. The method of claim 18, wherein the determining to insert the at least one DL RS comprises determining to insert the at least one DL RS within a first symbol in time of the first subset of symbols.

21. The method of claim 18, further comprising determining one or more symbols of the first subset of symbols in which an uplink (UL) DMRS is to be received from the UE, wherein the determining to insert the at least one DL RS comprises determining to insert the at least one DL RS within at least one symbol of the one or more symbols such that the inserted DL RS overlaps in time with the UL DMRS.

22. The method of claim 18, further comprising transmitting, to the UE, information that explicitly or implicitly indicates to the UE that the DL RS is inserted within the at least one of the first subset of symbols or the second subset of symbols.

* * * * *